(12) United States Patent
Serstad et al.

(10) Patent No.: US 12,479,665 B1
(45) Date of Patent: Nov. 25, 2025

(54) AUTO INDUCTION FROM AUTOBAGGER TO SORTING ROBOT

(71) Applicant: Tompkins Robotics, Inc., Orlando, FL (US)

(72) Inventors: James M. Serstad, Orlando, FL (US); Michael C. Futch, Cocoa, FL (US); Parthiban A. Mathavan, Cary, NC (US)

(73) Assignee: TOMPKINS ROBOTICS, INC., Orlando, FL (US)

( * ) Notice: Subject to any disclaimer, the term of this patent is extended or adjusted under 35 U.S.C. 154(b) by 0 days.

(21) Appl. No.: 19/227,578

(22) Filed: Jun. 4, 2025

Related U.S. Application Data

(63) Continuation of application No. PCT/US2025/032171, filed on Jun. 4, 2025.

(51) Int. Cl.
| | | |
|---|---|---|
| *B65G 1/137* | (2006.01) | |
| *B07C 3/00* | (2006.01) | |
| *B07C 3/08* | (2006.01) | |
| *B65B 5/04* | (2006.01) | |
| *B65B 5/06* | (2006.01) | |
| *B65B 35/32* | (2006.01) | |
| *B65G 1/04* | (2006.01) | |
| *B65G 1/06* | (2006.01) | |
| *B66F 9/06* | (2006.01) | |

(Continued)

(52) U.S. Cl.
CPC ........... *B65G 1/1378* (2013.01); *B07C 3/008* (2013.01); *B07C 3/08* (2013.01); *B65B 5/045* (2013.01); *B65B 5/06* (2013.01); *B65B 35/32* (2013.01); *B65G 1/0492* (2013.01); *B65G 1/06* (2013.01); *B65G 1/065* (2013.01); *B66F 9/065* (2013.01); *G05B 19/41895* (2013.01); *G06Q 10/087* (2013.01); *B65G 2203/0216* (2013.01)

(58) Field of Classification Search
CPC .... B65G 1/1378; B65G 1/0492; B65G 1/065; B65G 2203/0216; B65G 1/06; B07C 3/008; B07C 3/08; B65B 5/045; B65B 5/06; B65B 35/32; B66F 9/065; G05B 19/41895; G06Q 10/087
See application file for complete search history.

(56) References Cited

U.S. PATENT DOCUMENTS 10,954,065 B2 * 3/2021 Schroepf .............. B65G 1/1378
11,912,504 B2 * 2/2024 Lindley .................. B65B 35/50
(Continued)

FOREIGN PATENT DOCUMENTS

DE 102023103339 A1 * 8/2024 ............. B65G 65/00

*Primary Examiner* — Thomas Randazzo
(74) *Attorney, Agent, or Firm* — Parthiban A Mathavan

(57) ABSTRACT

System for packing and sorting comprises: a server comprising a memory, a processor, and a sortation engine, an automated packaging device, and a packaging sorting system. The automated packaging device is configured to: receive one or more sorted articles through an opening of a repository of the automated packaging device, and seal the repository to form a package. The package sorting system configured to: direct a package computer controlled vehicle to move to a receiving position about the automated packaging device for receiving the package from the automated packaging device, and direct the package computer controlled vehicle to transport and deposit the received package into a package receptacle.

16 Claims, 23 Drawing Sheets

(51) Int. Cl.
B66F 9/065 (2006.01)
G05B 19/418 (2006.01)
G06Q 10/087 (2023.01)

(56) References Cited

U.S. PATENT DOCUMENTS

| | | | |
|---|---|---|---|
| 2017/0174432 A1* | 6/2017 | Zhu | B07C 3/008 |
| 2020/0078828 A1* | 3/2020 | Futch | B65G 1/137 |
| 2021/0031240 A1* | 2/2021 | Carpenter | B07C 5/362 |
| 2022/0024691 A1* | 1/2022 | Serstad | B66F 9/063 |
| 2022/0073220 A1* | 3/2022 | White | B65B 57/00 |
| 2023/0068077 A1* | 3/2023 | Kashi | G07C 9/00309 |
| 2024/0317499 A1* | 9/2024 | Sakuma | B65G 1/0492 |
| 2025/0058361 A1* | 2/2025 | Cherif Idrissi El Ganouni | B65G 1/0492 |

\* cited by examiner

AUTO INDUCTION FROM AUTOBAGGER TO SORTING ROBOT

TECHNICAL FIELD

The present invention relates to article delivery technologies, and specifically to systems and methods for automated bagging, sorting, order consolidation, and shipping in order fulfillment facilities using robotic vehicles and other robotic solutions.

BACKGROUND ART

Automated fulfillment of customer orders is becoming ubiquitous with more businesses opting for automated filling operations to achieve economies of scale and to improve the overall efficiency of order fulfillment. However, automating various aspects of order fulfillment and packaging operations is challenging since it may require the integration of several dissimilar material handling sub-systems such that they operate synchronously as a single integral unit that avoids any bottle necks in order to optimize the order fulfillment operations. It is often technologically challenging to get one automated sub-system in the order fulfillment operations chain to seamlessly hand off an article or package to the next sub-system whereby a manual handoff may be needed between two such sub-systems such that a human operator may act as a relay between such sub-systems.

Accordingly, a need exists for a solution that would permit further expanding the automation aspects of an automated fill system to improve operational efficiencies in a reliable and cost-effective manner.

SUMMARY OF INVENTION

This summary is provided to introduce in a simplified form concepts that are further described in the following detailed descriptions. This summary is not intended to identify key features or essential features of the claimed subject matter, nor is it to be construed as limiting the scope of the claimed subject matter.

According to one or more implementations, a multi-function sorting system for packing and sorting is provided. In one embodiment, the multi-function sorting system ("system") includes a server. The server includes a memory, a processor, and a sortation engine. The multi-function sorting system also includes an automated packaging device configured to: receive one or more articles through an opening of a repository of the automated packaging device, and seal the repository to form a package. The multi-function sorting system also includes a package sorting system configured to: direct a package computer controlled vehicle to move to a receiving position about the automated packaging device for receiving the package from the automated packaging device and direct the package computer controlled vehicle to transport and deposit the received package into a package receptacle.

According to one implementation, the multi-function sorting system for packing and sorting further includes a secondary sorting system for sorting the one or more articles associated with an order into a respective article receptacle. According to one implementation, the secondary sorting system comprises a wall of sorting article receptacles for an operator to transfer all articles associated with an order to a respective article receptacle. According to one implementation, the secondary sorting system comprises a three-dimensional (3D) sorting system configured to receive an article to be sorted at a lift of the 3D sorting system.

According to at least one embodiment, the secondary sorting system comprises a three-dimensional (3D) sorting system that includes: two or more shelves, each shelf composed of a plurality of storage locations vertically arranged on the shelf, each storage location configured to accept therein an article receptacle; and, an article lift translating along three axes about a conveying rail frame, the conveying rail frame arranged between the two shelves and parallel to at least one of the two shelves, the article lift configured to sort an article received at the article lift to one of the plurality of article receptacles located at a storage location of a shelf responsive to instructions received from the server.

According to one implementation, the multi-function sorting system for packing and sorting further includes a primary sorting system, wherein an output of the primary sorting system is provided as an input to the 3D sorting system. According to one implementation, the 3D sorting system is configured for order consolidation whereby the one or more articles associated with an order are sorted into a respective article receptacle. According to one implementation, the primary sorting system comprises one or more of a: conveyor, robotic arm sorter, tilt tray sorter, sweep sorter, activated roller sorter, cross belt sorter, and split tray sorter.

According to one implementation, the multi-function sorting system for packing and sorting further includes a tote tilter positioned between the 3D sorting system and the automated packaging device, the tote tilter operating to empty the one or more articles out of an article receptacle of the 3D sorting system into a bagging inlet of the automated packaging device. According to one implementation, the package sorting system comprises a plurality of package computer controlled vehicles directed by package sorting controller. According to one implementation, the package computer controlled vehicles traverse a package sorting platform. According to one implementation, an elevator operates to transfer the package computer controlled vehicles between a floor level and the package sorting platform spaced apart from the floor level. According to one implementation, the primary sorting system comprises a plurality of article computer controlled vehicles traversing an article sorting platform, wherein the primary sorting system is configured to direct the article computer controlled vehicles to transport and deposit the one or more articles to be packaged at the lift of the 3D sorting system. According to one implementation, the article sorting platform is spaced apart from the package sorting platform, wherein optionally an elevator operates to transfer the article computer controlled vehicles between a floor level and the article sorting platform. According to one implementation, the package sorting platform is arranged above or below the article sorting platform in a vertically stacked configuration.

According to one implementation, the automated packaging device is further configured to print indicia to the package. According to one implementation, the indicia identify one or more of: a customer order associated with the package, a store associated with the package, a delivery address associated with the package, and a business associated with the package. According to one implementation, the one or more articles in the package comprise one or more of a: prescription medication, customer order, and store fulfillment order. According to one implementation, the 3D sorting system is further configured to determine that the automated packaging device is ready for a tote tilter to empty out the one or more articles present in an article receptacle of the 3D sorting system into a bagging inlet of the automated packaging device. According to one implementation, the system further includes one of: a conveyor, and a ramp for the package computer controlled vehicles to travel thereon.

According to one or more implementations, a system for packing and sorting includes a server comprising a memory, a processor, and a sortation engine. The system for packing and sorting also includes an automated packaging device configured to: receive one or more articles through an opening of a repository of the automated packaging device, and seal the repository to form a package. The system for packing and sorting also includes a package sorting system configured to: direct a package computer controlled vehicle to move to a receiving position about the automated packaging device for receiving the package from the automated packaging device, and direct the package computer controlled vehicle to transport and deliver the received package to a post-packing sorting system.

According to one implementation, an elevator transfers the package computer controlled vehicle from a floor level to a package sorting platform spaced apart from the floor level. According to one implementation, the package computer controlled vehicle deposits the package at a lift of a post-packing sorting system.

According to one implementation, the system for packing and sorting further includes: a primary sorting system configured to deliver the one or more articles to a secondary sorting system; the secondary sorting system configured to consolidate the one or more articles associated with an order to an article receptacle, and an article receptacle transport system configured to direct a receptacle computer controlled vehicle to transport the article receptacle to a delivery position about the automated packaging device.

According to one or more implementations, a system for packing and sorting includes: a server comprising a memory, a processor, and a sortation engine. The system for packing and sorting also includes a system for consolidation of articles into an order. system for packing and sorting also includes an automated packaging device configured to: receive one or more articles through an opening of a repository of the automated packaging device, and seal the repository to form a package. The system for packing and sorting also includes a package transfer system configured to direct a computer-controlled conveyance mechanism to transfer the package from the automated packaging device for delivery to a post-packing sorting system. According to one or more implementations, the package transfer system comprises a robotic arm configured to transfer the package to one or more of: a conveyor system and a robotic vehicle for delivery to the post-packing sorting system. According to one or more implementations, the package transfer system includes a robotic arm configured to transfer the package onto a robotic vehicle for delivery to the post-packing sorting system. According to one or more implementations, a system for packing and sorting includes a package transfer system configured to direct a computer-controlled conveyance mechanism to transfer the package from the automated packaging device for delivery to a post-packing sorting system. According to one or more implementations, the computer-controlled conveyance mechanism comprises a robotic arm configured to transfer the package to one or more of: a conveyor system and a robotic vehicle for delivery to the post-packing sorting system. According to one or more implementations, the computer-controlled conveyance mechanism comprises a robotic arm configured to transfer the package onto a robotic vehicle for delivery to the post-packing sorting system.

According to one or more implementations, a system for packing and sorting includes: a server comprising a memory, a processor, and a sortation engine, an automated packaging device, and a package sorting system. The automated packaging device is configured for: receiving one or more articles through an opening of a repository of the automated packaging device, and sealing the repository to form a package. The package sorting system configured to: direct a package computer controlled vehicle to move to a receiving position about the automated packaging device for receiving the package from the automated packaging device; and, direct the package computer controlled vehicle to transport and deliver the received package to a post-packing sorting system. According to one or more implementations, an elevator transfers the package computer controlled vehicle from a floor level to a package sorting platform spaced apart from the floor level. According to one or more implementations, the package computer controlled vehicle deposits the package at a lift of a post-packing sorting system. According to one or more implementations, the system further includes: a primary sorting system configured to deliver the one or more articles to a secondary sorting system; the secondary sorting system configured to consolidate the one or more articles associated with an order to an article receptacle, and an article receptacle transport system configured to direct a receptacle computer controlled vehicle to transport the article receptacle to a delivery position about the automated packaging device.

According to one or more implementations, a system for packing and sorting, includes: a server comprising a memory, a processor, and a sortation engine; a system for consolidation of articles into an order; an automated packaging device; and, a package transfer system. The automated packaging device is configured to: receive one or more articles through an opening of a repository of the automated packaging device, and seal the repository to form a package. The package transfer system configured to direct a computer-controlled conveyance mechanism to transfer the package from the automated packaging device for delivery to a post-packing sorting system. According to one or more implementations, the computer-controlled conveyance mechanism comprises a robotic arm configured to transfer the package to one or more of: a conveyor system and a robotic vehicle for delivery to the post-packing sorting system. According to one or more implementations, the computer-controlled conveyance mechanism comprises a robotic arm configured to transfer the package onto a robotic vehicle for delivery to the post-packing sorting system.

BRIEF DESCRIPTION OF THE DRAWINGS

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

The figures described below depict various aspects of the applications, methods, and systems disclosed herein. It should be understood that each figure depicts an embodiment of a particular aspect of the disclosed applications, systems, and methods, and that each of the figures is intended to accord with a possible embodiment thereof. Furthermore, wherever possible, the following description refers to the reference numerals included in the following figures, in which features depicted in multiple figures are designated with consistent reference numerals.

DETAILED DESCRIPTION OF THE EMBODIMENTS

Figure 1:
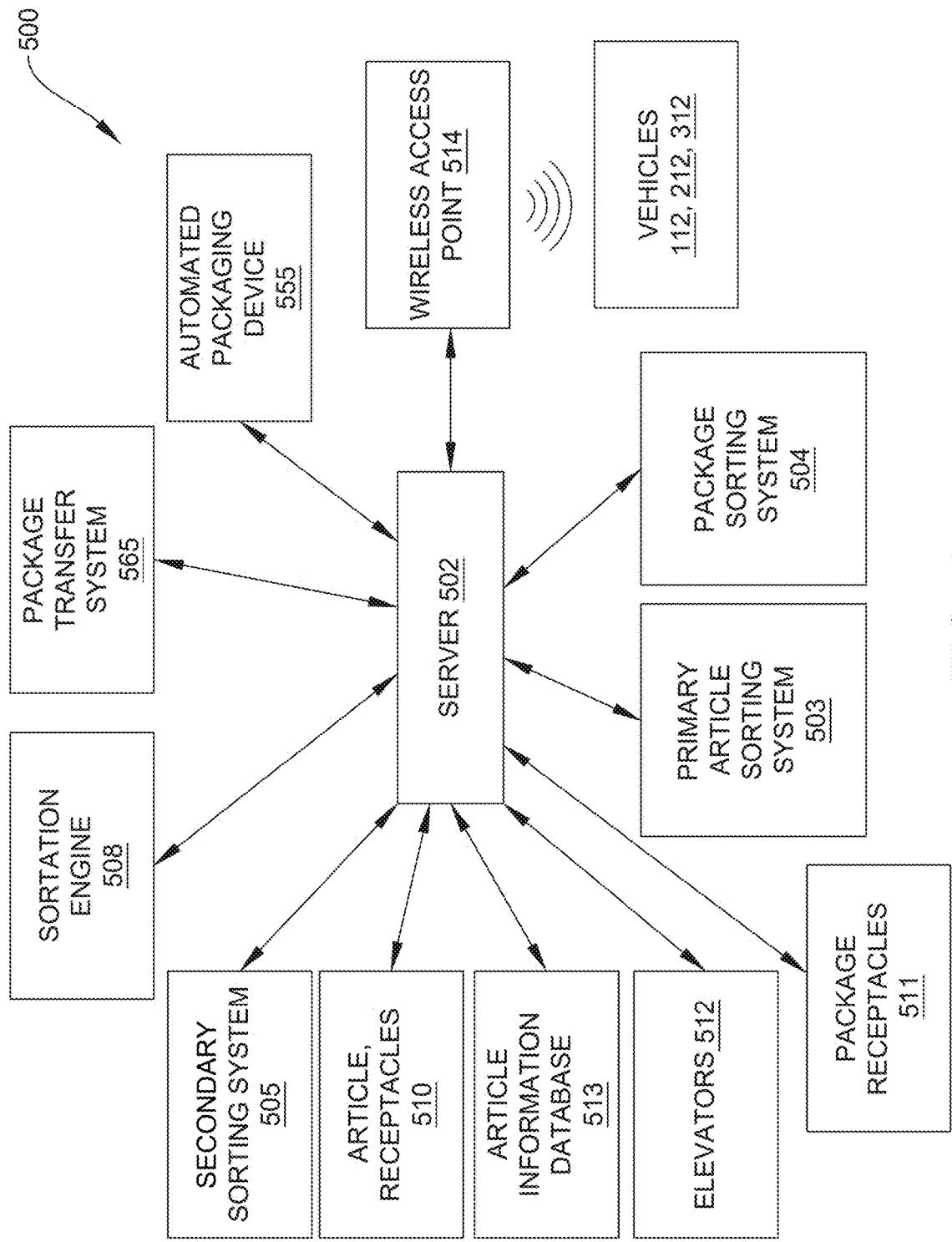
FIG. 1 illustrates a block diagram of an exemplary system for use in directing a sort and ship operations in a centralized or localized sorting facility, according to at least one embodiment of the presently disclosed subject matter.

Below, the technical solutions in the examples of the present invention are depicted clearly and comprehensively with reference to the figures according to the examples of the present invention. Obviously, the examples depicted here are merely some examples, but not all examples of the present invention. In general, the components in the examples of the present invention depicted and shown in the figures herein can be arranged and designed according to different configurations. Thus, detailed description of the examples of the present invention provided in the figures below are not intended to limit the scope of the present invention as claimed, but merely represent selected examples of the present invention. On the basis of the examples of the present invention, all of other examples that could be obtained by a person skilled in the art without using inventive efforts will fall within the scope of protection of the present invention.

As noted earlier, automated fulfillment of customer orders is becoming ubiquitous with more businesses opting for automated filling operations to achieve economies of scale and to improve the overall efficiency of order fulfillment. However, automating various aspects of order fulfillment and packaging operations is challenging since it may require integration of several dissimilar material handling sub-systems to operate as a single integral unit without any bottle necks in order to optimize the order fulfillment operations. When it is technologically challenging to get one automated sub-system in the order fulfillment operations chain to seamlessly hand off an article or package to the next sub-system, a manual handoff may be needed between two such sub-systems whereby a human operator may act as a relay between such sub-systems.

Embodiments disclosed herein overcome several limitations associated with limited space availability for automated order fill operations by providing for systems, methods and processes for packing and sorting that overcome the limitations of the art. Embodiments of the presently disclosed subject matter further provide for a solution that can permit a central order fulfillment sorter system to operate in a fully automated fashion in a reliable and cost-effective manner. Embodiments disclosed herein can provide for one or more of: an automated order consolidation system that consolidates all articles associated with an order into a single consolidated grouping, an automated order packaging device, an automated picking robotic arm, an automated robotic vehicles for transporting the packaging to for delivery to a post-packing sorting system, and an automated conveyor system for transporting the packaging to for delivery to a post-packing sorting system. Embodiments disclosed herein also provide for an improved automation solution by way of order consolidation, packaging and shipping in one combined footprint. Embodiments disclosed herein also provide for systems, methods, and apparatus for directing, managing, and controlling multi-system or multi-function sortation of various articles including prescription medications in a centralized or localized sorting operation. Also provided herein are systems, methods, and apparatus for order consolidation and for automated packaging being sorted.

According to at least one embodiment, as shown in FIG. 1, a system for automated sorting and packaging of order such as system 500 comprises, among others, a control server such as server 502. Server 502 comprises, among others, a memory, and a processor. System 500 also comprises a package sorting system 504, a primary sorting system 503, one or more elevators 512, an article information database 513, a secondary sorting system 505, sortation engine 508, package transfer system 565, automated packaging device 555, and a wireless access point 514. Sortation engine 508 is configured to assist sorting operations and order consolidation operations handled or directed by system 500. System 500 further comprises a plurality of computer-controlled transport vehicles such as article computer controlled vehicles 112 (alternately referred to as "vehicles 112"), package computer controlled vehicles 212 (alternately referred to as vehicles 212"), and receptacle computer controlled vehicles 312 (alternately referred to as "vehicles 312"). In at least one embodiment, each of vehicles 112, vehicles 212, and vehicles 312 are AMRs (automated mobile robots).

Figure 2:
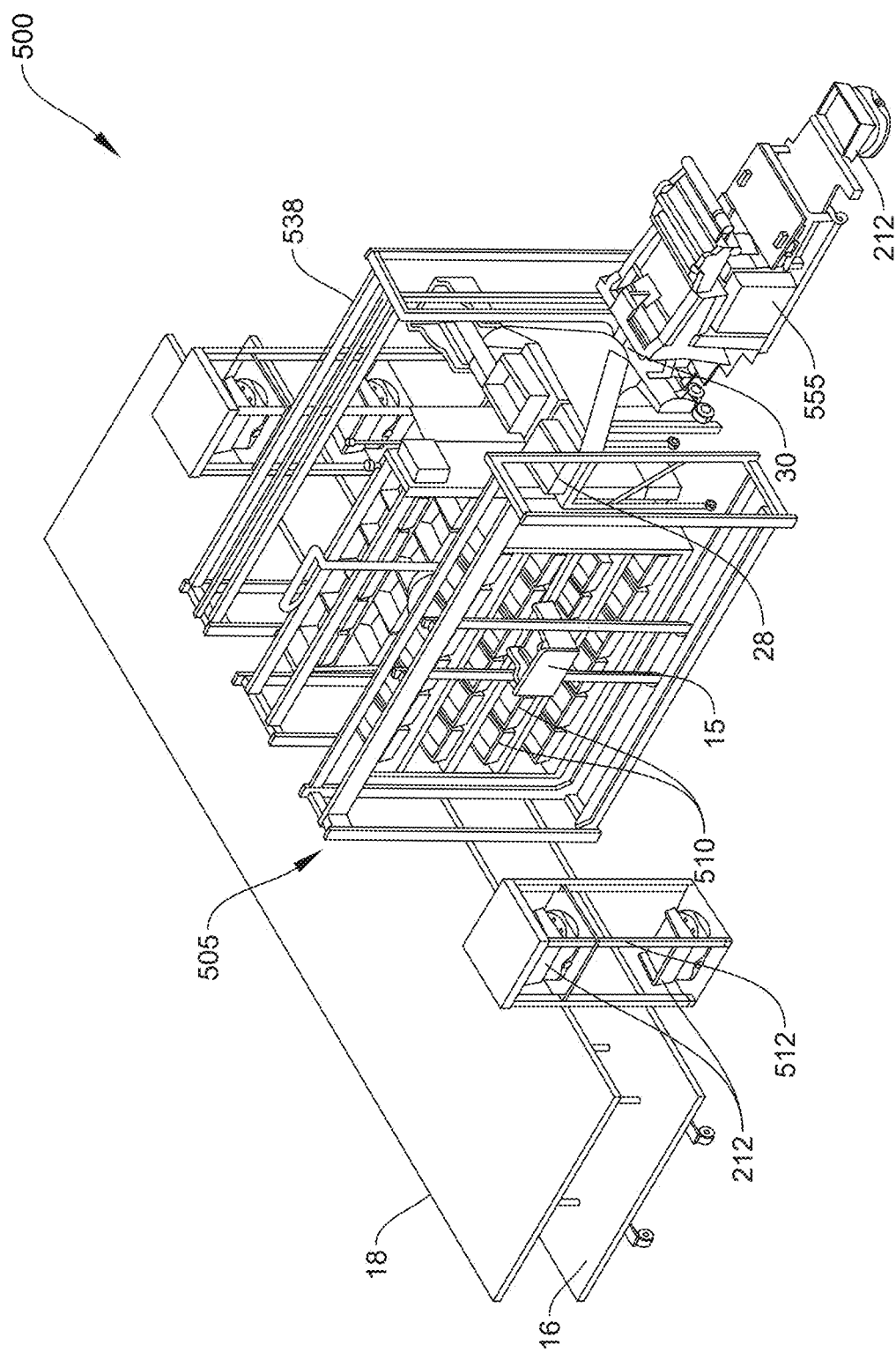
FIG. 2 illustrates a side perspective view of an example implementation of the system of FIG. 1 that comprises first and second platforms along with a secondary sorting system comprising sort shelf banks providing enhanced sorting capability and an automated packaging device, according to one or more implementations of the presently disclosed subject matter.
Figure 3:
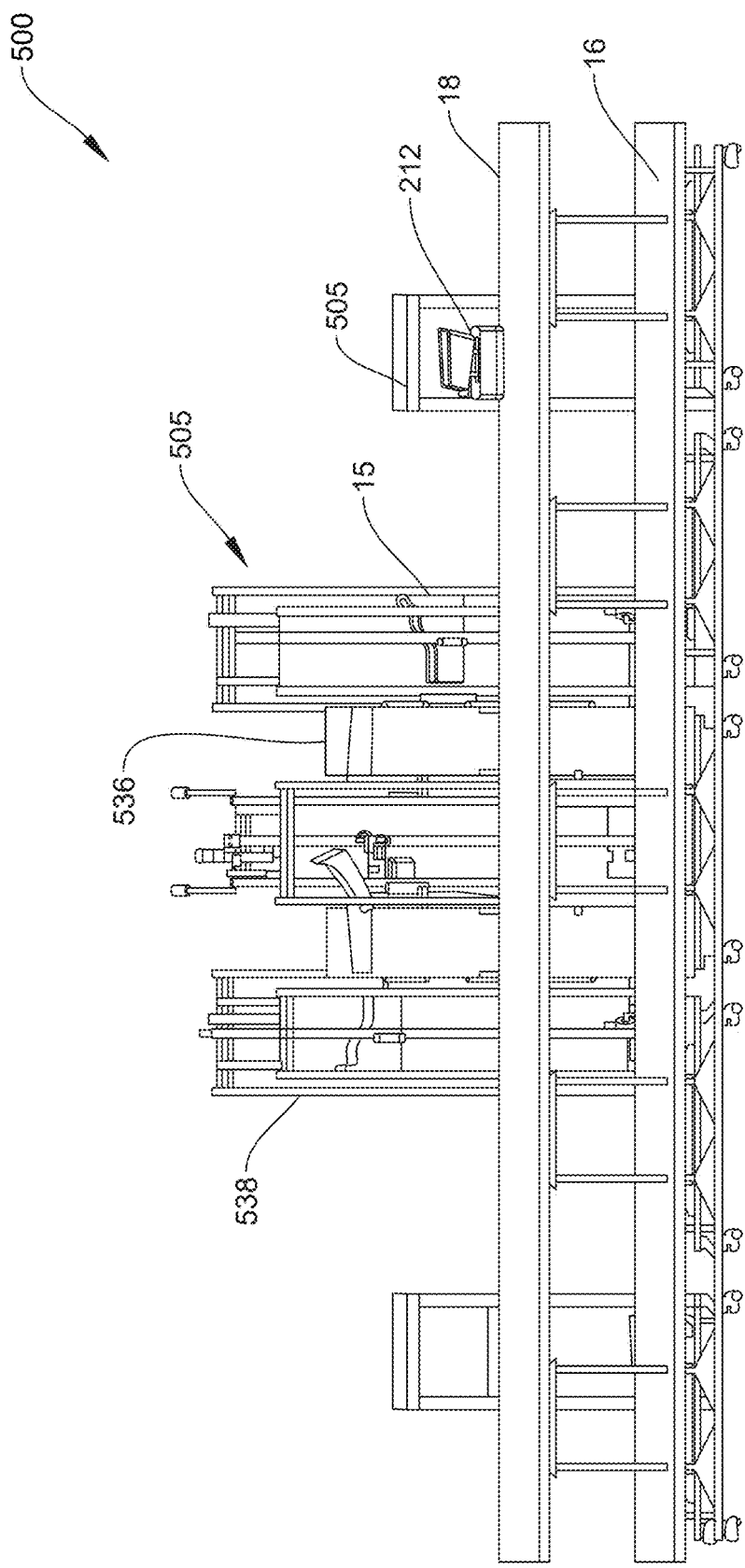
FIG. 3 illustrates a rear profile view of the system of FIG. 2, according to at least one embodiment of the presently disclosed subject matter.

Referring to FIG. 2, in one embodiment, a package sorting platform 18 is arranged above or below article sorting platform 16 in a vertically stacked configuration on the same footprint whereby the total footprint needed for both systems is equal to the footprint needed for one of those two systems; in one alternate embodiment, the total footprint needed for both systems is equal to just the footprint needed for the larger of two those systems. FIG. 3 illustrates a rear profile view of the system of FIG. 2. FIG. 3 further illustrates vehicle 212 traversing package sorting platform 18 for transporting and depositing a package 24 into a receptacle such as, for example, package receptacles. FIG. 3 also illustrates article sorting platform 16 provided for vehicles 112 to transport and deposit articles 20 into receptacles such as, for example, article receptacles 510. In one embodiment, vehicles 112 traverses article sorting platform 16 for transporting and depositing articles 20 (including articles such as prescription drug containers 20a shown in FIG. 19) into article receptacles 510. In one embodiment, each article receptacle 510 corresponds to a customer order or business order wherein server 502 associates each article receptacle 510 with a respective customer order.

In various embodiments, automated packaging device 555 is configured to receive one or more articles 20, for example, associated with a single order, through an opening of a repository of the automated packaging device 555. Automated packaging device 555 is further configured to seal the repository to form a package such as package 24. In various embodiments, the repository can take the form of a plastic bag, poly bag, poly mailer, cardboard box, paper container, a cardboard container or any other similar repository or packaging material well known in the art. In one embodiment, automated packaging device 555 is an automated bagging equipment sold by Pregis® such as, for example, Pregis Sharp™ MaxPro Series automated bagging equipment. In one embodiment, automated packaging device 555 takes the form of an autobagger described in US Patent Application No. 2022/0073220 A1. In one embodiment, automated packaging device 555 comprises any automated bagging equipment commonly sold in the market, as understood by persons of skill in the relevant art. In one embodiment, automated packaging device 555 comprises or takes the form of an auto bagger. As used herein, "auto bagger" refers to automated packaging device, alternately referred to as automatic bagging machines, automatic baggers, auto boxers or auto baggers, are a type of packaging equipment that quickly and effectively fill products into a poly bag or another container or receptacle. Auto baggers are a type of automated packaging equipment and may include automated boxers, carton erectors and the like.

In various embodiments, automated packaging device 555 is further configured to print indicia such as indicia 26 to the package 24. Indicia 26 may identify one or more of: a store address, a customer address, a store identity, a customer identity, a customer order associated with the package, a store associated with the package, a delivery address associated with the package, a business associated with the package, and similar other information. Each package 24 may contain one or more articles 20; each package 24 may comprise one or more of a: prescription medication, customer order, and store fulfillment order. In one embodiment, indicia 26 may include destination information, e.g., in the form of shipping information. In one embodiment, indicia 26 may include a shipping label. The shipping label may carry the address of a store or local pharmacy associated with a customer or customer order; the shipping label may alternately just carry information regarding the customer order along with information on the store or local pharmacy at which the customer is expected to pick up the package 24. In at least one embodiment, shipping label may just carry a store or local pharmacy address and an order number, which the system or server can utilize to associate with the customer information whereby no customer information is provided on package 24. In one embodiment, the shipping label may carry the address of a customer, or an address associated with a customer order.

Figure 18:
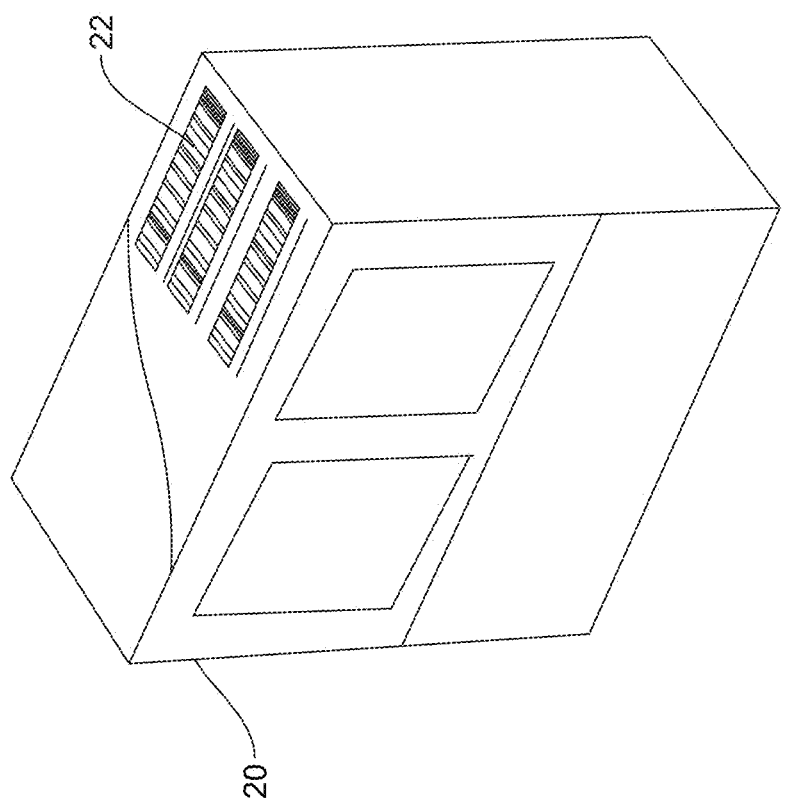
FIG. 18 illustrates a perspective view of an article with a tag coupled thereto, according to at least one embodiment of the presently disclosed subject matter.
Figure 19:
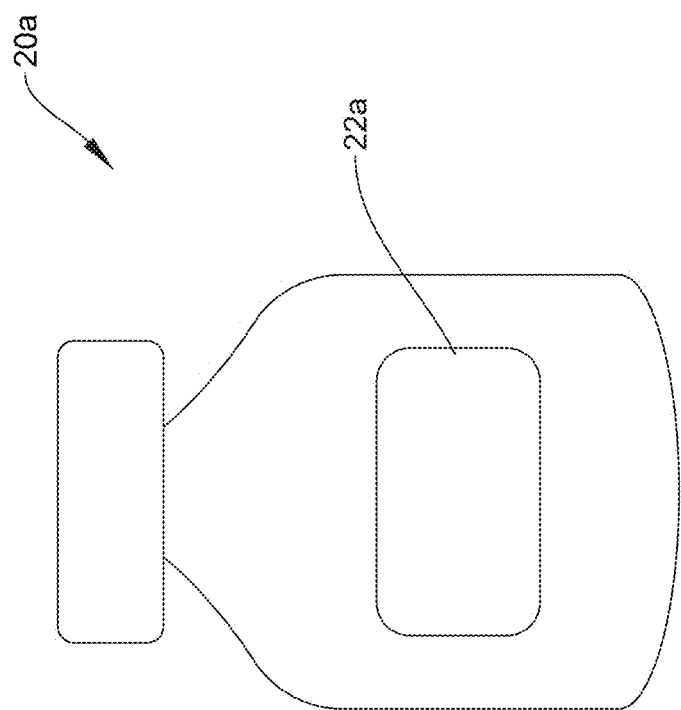
FIG. 19 illustrates a front schematic view of an article in the form of a prescription medication vial with a tag coupled thereto, according to at least one embodiment of the presently disclosed subject matter.
Figure 20:
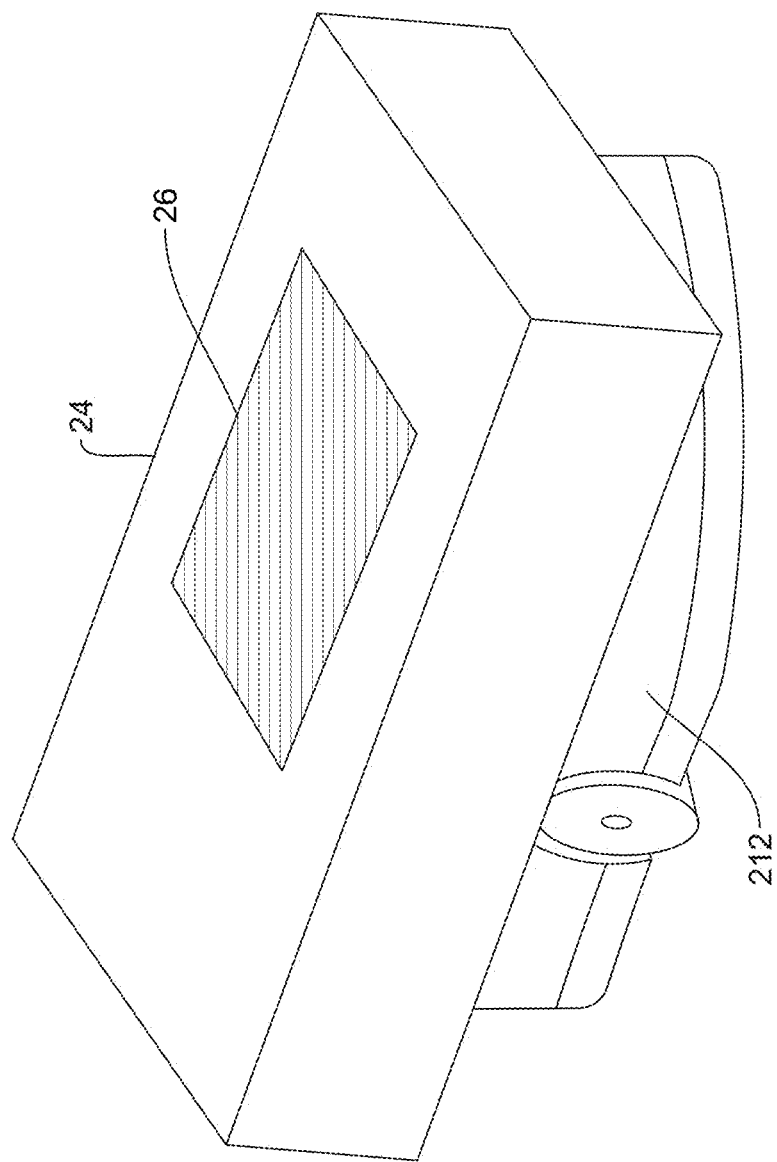
FIG. 20 illustrates a perspective view of a package with a label or indicia coupled thereto, wherein the package contains one or more articles, fluid containers, or prescription medication vials, according to at least one embodiment of the presently disclosed subject matter.

In one embodiment, package 24 is scanned manually or auto-scanned before or after it is placed on a vehicle 212. For example, in one embodiment, a package information acquisition device electronically coupled to server 502 operates to acquire information present on a tag or label such as indicia 26 present on package 24. In one embodiment, vehicle 212 carries package 24 proximate to a package receptacle 511 assigned by system 500 or by server 502, and the package 24 is diverted and deposited into the assigned package receptacle 511. In one embodiment, server 502 associates each package receptacle 511 with one of: a zip code, a store location, or a local physical area. In some embodiments, each article 20 carries a label, bar code or similar other identification information thereon. For example, FIG. 18 shows an article 20 with a tag 22 coupled thereto. FIG. 19 shows an article 20 in the form of a prescription drug container 20a with a vial tag 22a coupled thereto. FIG. 20 shows a package 24 with an indicia coupled thereto, wherein the package contains one or more articles 20 therein.

In at least one embodiment, system 500 further comprises package sorting system 504. Package sorting system 504 is configured to: direct a vehicle 212 to move to a receiving position about the automated packaging device 555 for receiving the package 24 from the automated packaging device 555. In one embodiment, package sorting system 504 is further configured to: direct the vehicle 212 to transport and deposit the received package 24 into a package receptacle. In one embodiment, package sorting system 504 is further configured to: direct vehicle 212 to transport and deliver the received package 24 to a location of further processing. In various embodiments, the further processing location may comprise a shipping location, a consolidation location, an assembling location, a shipment location, or a similar other location. In one embodiment, package sorting system 504 is further configured to: direct vehicle 212 to transport and divert/deposit the package 24 into the assigned package receptacle 511.

In at least one embodiment, package sorting system 504 comprises a plurality of vehicles 212 directed by package sorting controller forming part of system 500 or by server 502. In one embodiment, package sorting system 504 comprises a plurality of vehicles 212 traversing one or more of: the floor level and package sorting platform 18 spaced apart from the article sorting platform 16 and optionally the floor level for transporting and depositing packages into package receptacles. In at least one embodiment, package computer controlled vehicles 212 traverse a package sorting platform 18 with elevator 512 operating to transfer the package computer controlled vehicles 212 between a floor level 32 and the package sorting platform 18 spaced apart from the floor level 32. Package sorting system 504 accordingly operates to sort package 24. In one embodiment, package sorting platform 18 is arranged above article sorting platform 16 in a vertically stacked configuration.

FIG. 2 illustrates one embodiment of article sorting platform 16 and package sorting platform 18 along with a secondary sorting system 505 comprising sort shelf banks providing enhanced sorting capability and an automated packaging device, according to one or more implementations of the presently disclosed subject matter. In one embodiment, one or more articles 20 needed to fulfill an order are consolidated by a multi-function sorting system that comprises one or more of: a primary sorting system 503, a package sorting system 504, a secondary sorting system 505, and optionally, an article information acquisition device electronically coupled to server 502. The information acquisition device operates to acquire information present on a tag 22 present on article 20 and indicia 26 present on package 24. In at least one embodiment, the information acquisition device is omitted with the article or package identity conveyed electronically by primary sorting system 503 or package sorting system 504.

In various embodiments, primary sorting system 503 comprises one or more of a: vehicle 112, conveyor, robotic arm sorter, tilt tray sorter, sweep sorter, activated roller sorter, cross belt sorter, and split tray sorter. In at least one embodiment, primary sorting system 503 for sorting articles 20 comprises: a plurality of vehicles 112 traversing an article sorting platform 16 for transporting and depositing articles 20 into an assigned article receptacle 510 among a plurality of article receptacles 510. The plurality of vehicles 112 may be directed by an article sorting controller forming part of system 500 or by server 502 to traverse article sorting platform 16 for the transport and deposit of one or more articles 20 at article lift 15 of secondary sorting system 505. In one embodiment, an output of the primary sorting system 503 is provided as an input to secondary sorting system 505.

Figure 4:
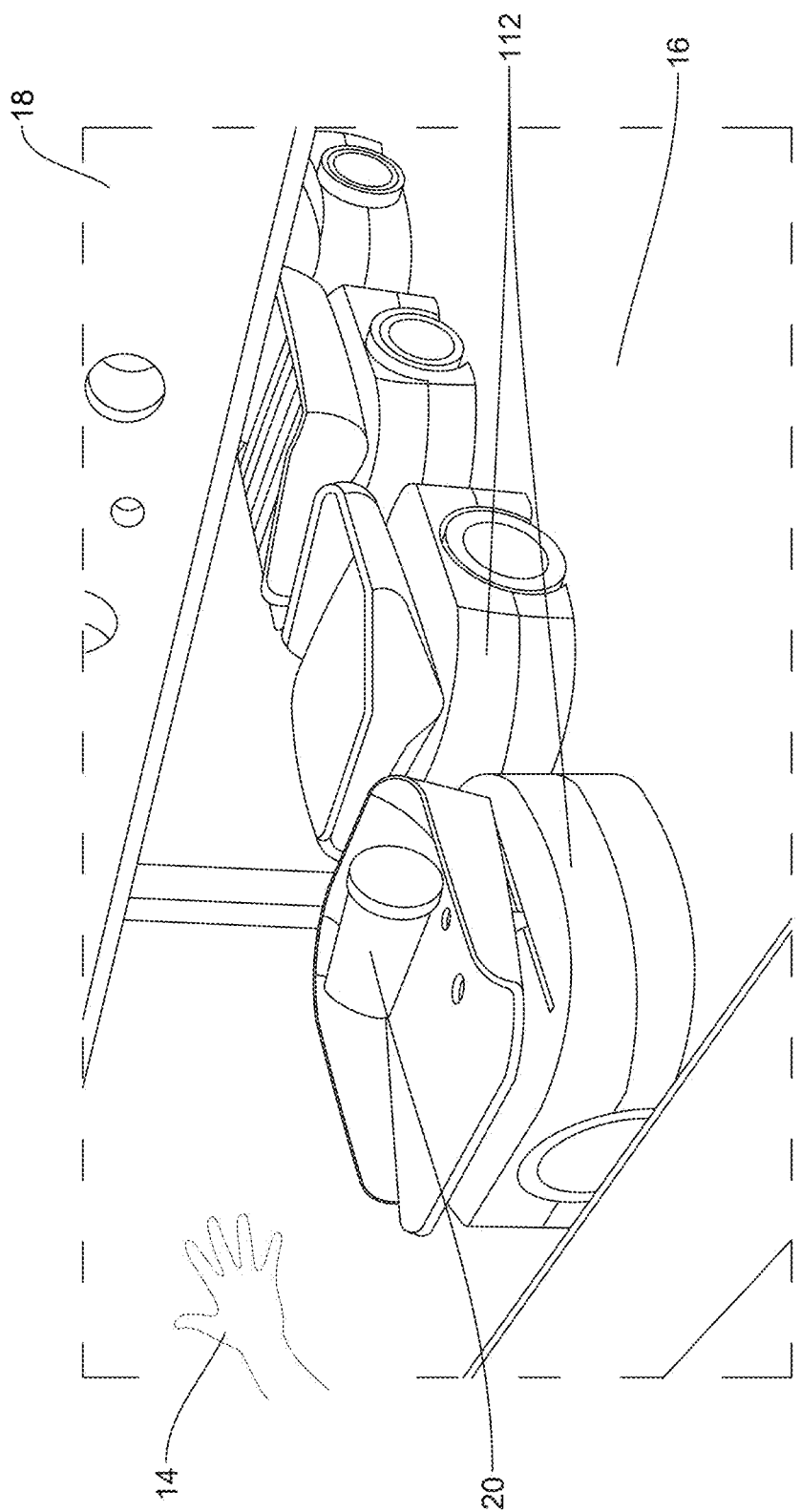
FIG. 4 illustrates a side perspective view of a portion of the first and second platforms of FIG. 2 with an article being manually loaded onto an article computer controlled vehicle, according to at least one embodiment of the presently disclosed subject matter.
Figure 5:
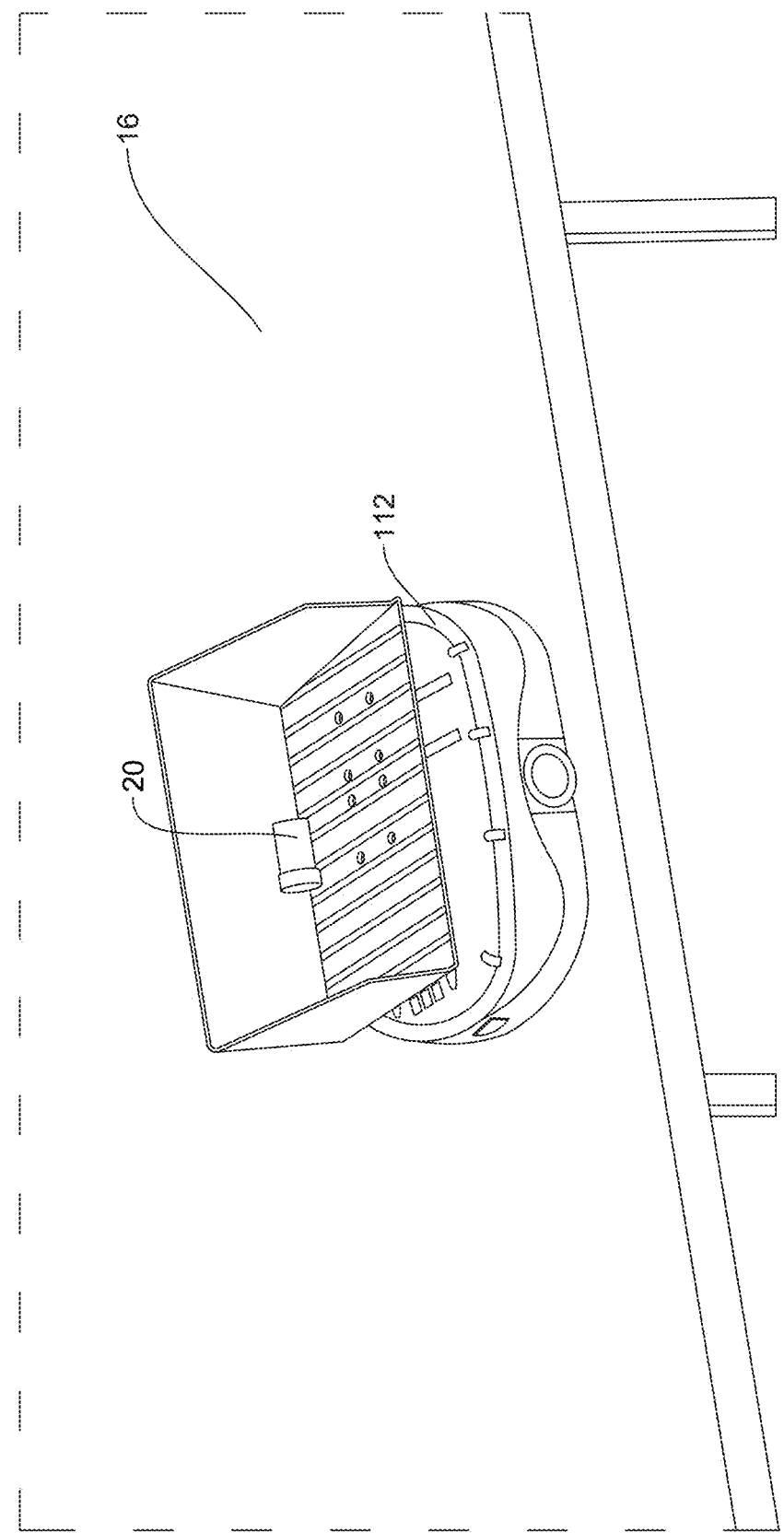
FIG. 5 illustrates a side perspective view of a portion of the first platform of FIG. 2 with an article being carried by the article computer controlled vehicle, according to at least one embodiment of the presently disclosed subject matter.

During operations, in one embodiment, server 502 receives an order for a plurality of articles 20. In some embodiments, articles 20 represent prescription medication, as shown, for example, in FIG. 19. After server 502 receives the order, server 502 directs primary sorting system 503 to transfer all articles 20 associated with the received order to an automated article lift of secondary sorting system 505 such as article lift 15. In some embodiments, each one of the articles 20 to be sorted to the order is inducted onto a vehicle 112 traveling on article sorting platform 16. For example, FIG. 4 illustrates a portion of the first and second platforms of FIG. 2 with an article being loaded onto a vehicle 112 by a human operator 14. In the same or different embodiment, vehicle 112 that receives an article 20 travels on article sorting platform 16 (see FIG. 5) to a position that is juxtaposed to secondary sorting system 505. On reaching this position, vehicle 112 deposits the inducted article 20 into or onto article lift 15 of secondary sorting system 505. In one alternate embodiment, server 502 directs an automated robotic arm or a human operator to place or induct each article 20 associated with the order carried on vehicle 112 into article lift 15 of secondary sorting system 505. Package sorting system 504 in general, and article lift 15 in particular, are in communication with server 502. Article lift 15, based on instructions received from server 502, transports one or more received articles 20 associated with the order, and deposits the articles 20 into one selected article receptacle 510, among several article receptacles 510, as determined by server 502 as being associated with the order that the articles 20 correspond to. Server 502 may further direct the deposition of all articles associated with the same order into the same article receptacle 510. Some orders may only require one article 20 to complete the order whereas other orders may require a plurality of either the same articles 20 or disparate articles 20 to complete the order. Accordingly, in various embodiments, secondary sorting system 505 performs auto consolidation of one or more orders.

According to at least one embodiment, an output of primary sorting system 503 in the form of an article 20 associated with an order is provided as an input to secondary sorting system 505. According to at least one embodiment, secondary sorting system 505 comprises a three-dimensional (3D) sorting system (see FIG. 2 for example). In one embodiment, secondary sorting system 505 in the form of the 3D sorting system is configured to receive an article 20 to be sorted at a lift of the 3D sorting system. According to at least one embodiment, 3D sorting system is configured for order consolidation whereby the one or more articles 20 associated with an order are sorted into a respective article receptacle 510.

In at least one embodiment, the 3D sorting system comprises: two or more shelves 536, each shelf composed of a plurality of storage locations, each storage location configured to accept therein an article receptacle 510. The 3D sorting system further comprises an article lift 15 that is configured to translate along two or three axes about a conveying rail frame 538. Conveying rail frame 538 is positioned parallel to at least one of the shelves 536. Article lift 15 is configured to receive an article 20 to be sorted; article lift 15 operates to transport the received article 20 to an article receptacle 510 assigned by server 502. Article receptacle 510 is located at a storage location of a shelf 536. Server 502 may associate the assigned article receptacle 510 with an order. Server 502 may further associate the article 20 deposited into the assigned article receptacle 510 by article lift 15 with the same order.

In one embodiment, secondary sorting system 505 comprises an article lift 15 that receives an article 20 from one of: a vehicle 112 traveling on article sorting platform 16, a robotic arm, and a human operator. Further, article lift 15, based on instructions received from server 502, transports and deposits the article 20 into one selected article receptacle 510 (among several article receptacles 510) as determined by server 502 as being associated with an order that the article 20 corresponds to.

Once server 502 determines that all articles 20 associated with an order have been deposited into an assigned article receptacle 510 thereby rendering it a completed order article receptacle 510, server 502 may then direct secondary sorting system 505 to transport the assigned article receptacle 510 and deposit all articles 20 contained therein into a bagging inlet 30 of automated packaging device 555. In one embodiment, either server 502 or secondary sorting system 505 directs an automated lift such as, for e.g., a dedicated article receptacle lift to transport the assigned article receptacle 510 (containing, for e.g., all articles for a completed order) and the discharge all articles contained within the assigned article receptacle 510 into bagging inlet 30 of automated packaging device 555. In one embodiment, server 502 or secondary sorting system 505 may alternately use article lift 15 to transport the assigned article receptacle 510 to bagging inlet 30 of automated packaging device 555. In one embodiment, secondary sorting system 505 may optionally include a tote tilter 28 that operates as a transition point to which the entire contents of assigned article receptacle 510 is deposited into, for example, by an automated article receptacle lift. After such deposition of all articles contained in the assigned article receptacle 510 or the completed order article receptacle 510 into tote tilter 28, tote tilter 28 tilts in a manner that causes all articles 20 present in tote tilter 28 (that were previously transferred into it from the assigned article receptacle 510) are deposited into bagging inlet 30 of automated packaging device 555.

In one embodiment, 3D sorting system or system 500 is further configured to determine when the automated packaging device 555 is ready for a tote tilter 28 to empty out the one or more articles 20 present in an article receptacle 510 of the 3D sorting system into a bagging inlet 30 of the automated packaging device 555. In one embodiment, tote tilter 28 accordingly operates to empty one or more articles 20 out of a "completed order" article receptacle 510 into a bagging inlet 30 of an automated packaging device 555. In one embodiment, tote tilter 28 is positioned between the 3D sorting system and the automated packaging device 555. In one embodiment, secondary sorting system 505 in the form of the 3D sorting system is configured to receive an article 20 to be sorted at a lift of the 3D sorting system. According to at least one embodiment, 3D sorting system is configured for order consolidation whereby the one or more articles 20 associated with an order are sorted into a respective article receptacle 510. In one alternate embodiment, a manual operator (i.e., a person) operates to empty one or more articles 20 out of a "completed order" article receptacle 510 into a bagging inlet 30 of an automated packaging device 555.

In at least one embodiment, secondary sorting system 505 may further comprise: a sorting platform such as, for example, article sorting platform 16 and package sorting platform 18, wherein the sorting platform is provided with a loading inlet and an unloading outlet. Secondary sorting system 505 may further comprise a plurality of article computer controlled vehicles 112 traversing an article sorting platform 16 for transporting and depositing articles 20 into article receptacles 510. Accordingly, in at least one embodiment, secondary sorting system 505 comprises a three-dimensional (3D) sorting system configured to receive an article to be sorted at a lift of the 3D sorting system. In at least one embodiment, secondary sorting system 505 comprises a three-dimensional (3D) sorting system sold by Tompkins Robotics, Inc. of Orlando, Florida, USA under the tradename tSort3D™.

In at least embodiment, during operations, system 500 configured for use in sorting operations of customer prescription medication orders receives an article 20 in the form of prescription drug container 20a (see FIG. 19) that contains a medication (in solid, liquid or vapor form or combinations thereof) that is based on a prescription order (alternately referred to as "order") received from a customer (i.e., a customer prescription medication order or request). In the same or different embodiment, system 500 is configured for acquiring, by an information acquisition device of an article information present on vial tag 22a coupled to prescription drug container 20a. System 500 or server 502 is accordingly configured to receive the article information acquired by the information acquisition device electronically coupled to server 502. Server 502 is further configured to determine an article receptacle 510, among a plurality of article receptacles 510, for the combination of vehicle 112 and article lift 15 to transport and deposit the prescription drug container 20a into a selected article receptacle 510 based on the article information received from the information acquisition device. In at least one embodiment, after receiving the prescription drug container 20a that is loaded or inducted thereto by a human or a robotic arm, vehicle 112 starts traveling towards and deposits the prescription drug container 20a onto article lift 15 so that article lift 15 can in turn transport and deposition the prescription drug container 20a into a selected article receptacle 510 assigned by system 500 or server 502 for that specific prescription drug container 20a. In various embodiments, server 502 is configured to direct article lift 15 of secondary sorting system 505 to deposit the prescription drug container 20a into the assigned article receptacles 510 to thereby perform auto consolidation of one or more store or customer prescription orders.

Figure 9:
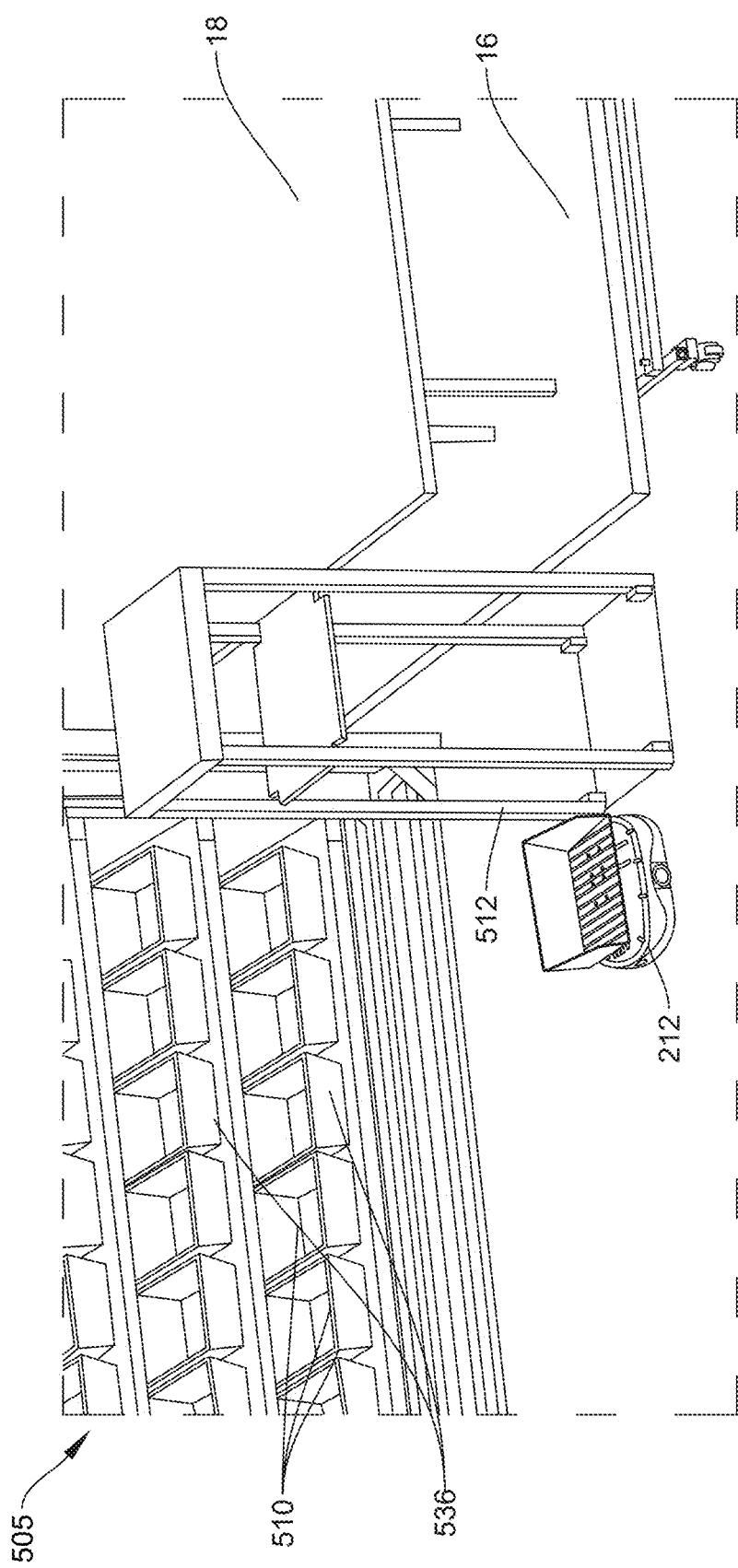
FIG. 9 illustrates a side perspective view of a portion of a system for use in directing a sort and ship operations that shows an elevator, according to at least one embodiment of the presently disclosed subject matter.
Figure 10:
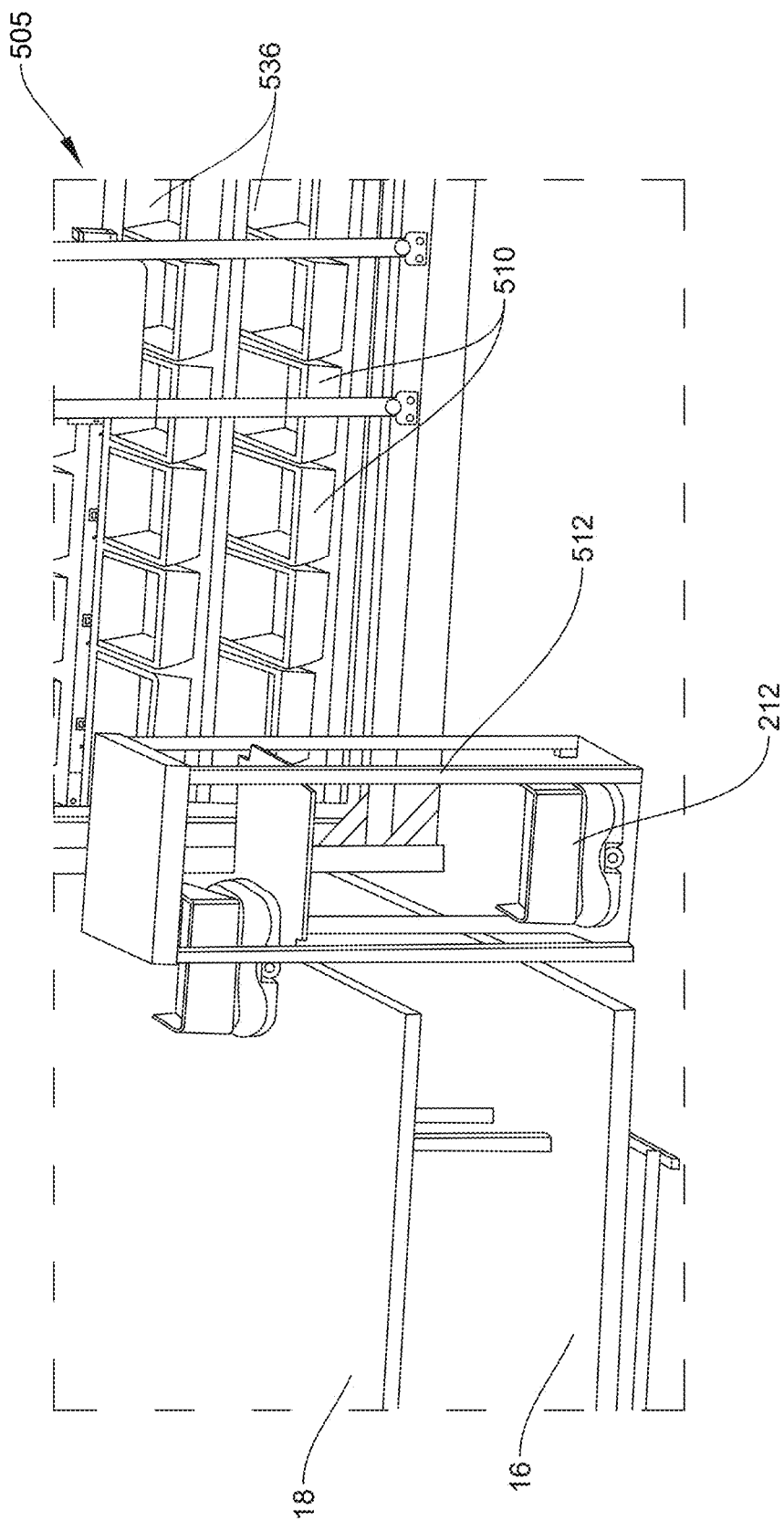
FIG. 10 illustrates a side perspective view of a portion of a system for use in directing a sort and ship operations that shows a computer controlled vehicle exiting an elevator onto a platform, according to at least one embodiment of the presently disclosed subject matter.
Figure 11:
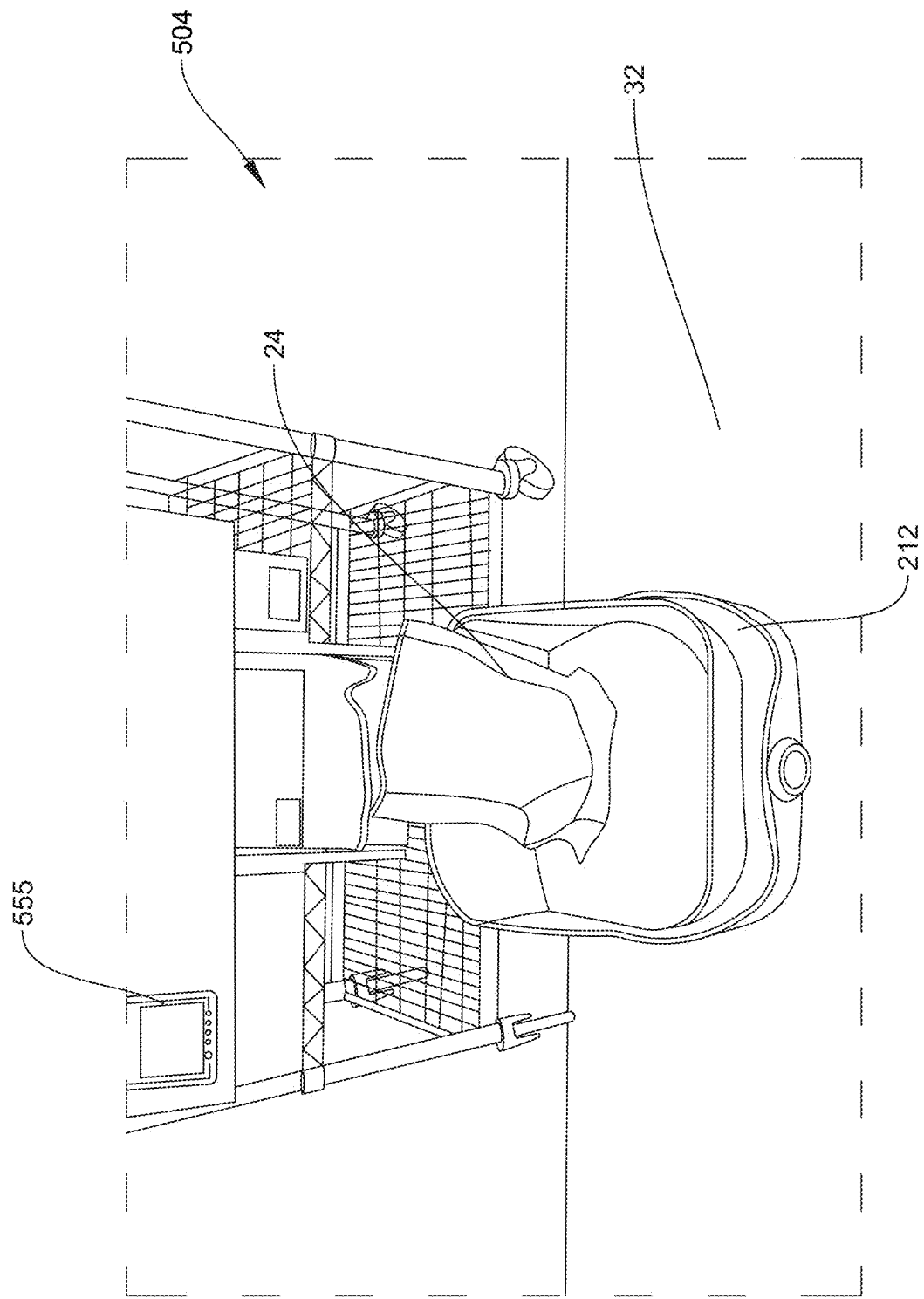
FIG. 11 illustrates a perspective view of a portion of a system for use in directing a sort and ship operations that shows a package being output from an automated packaging device, according to at least one embodiment of the presently disclosed subject matter.
Figure 12:
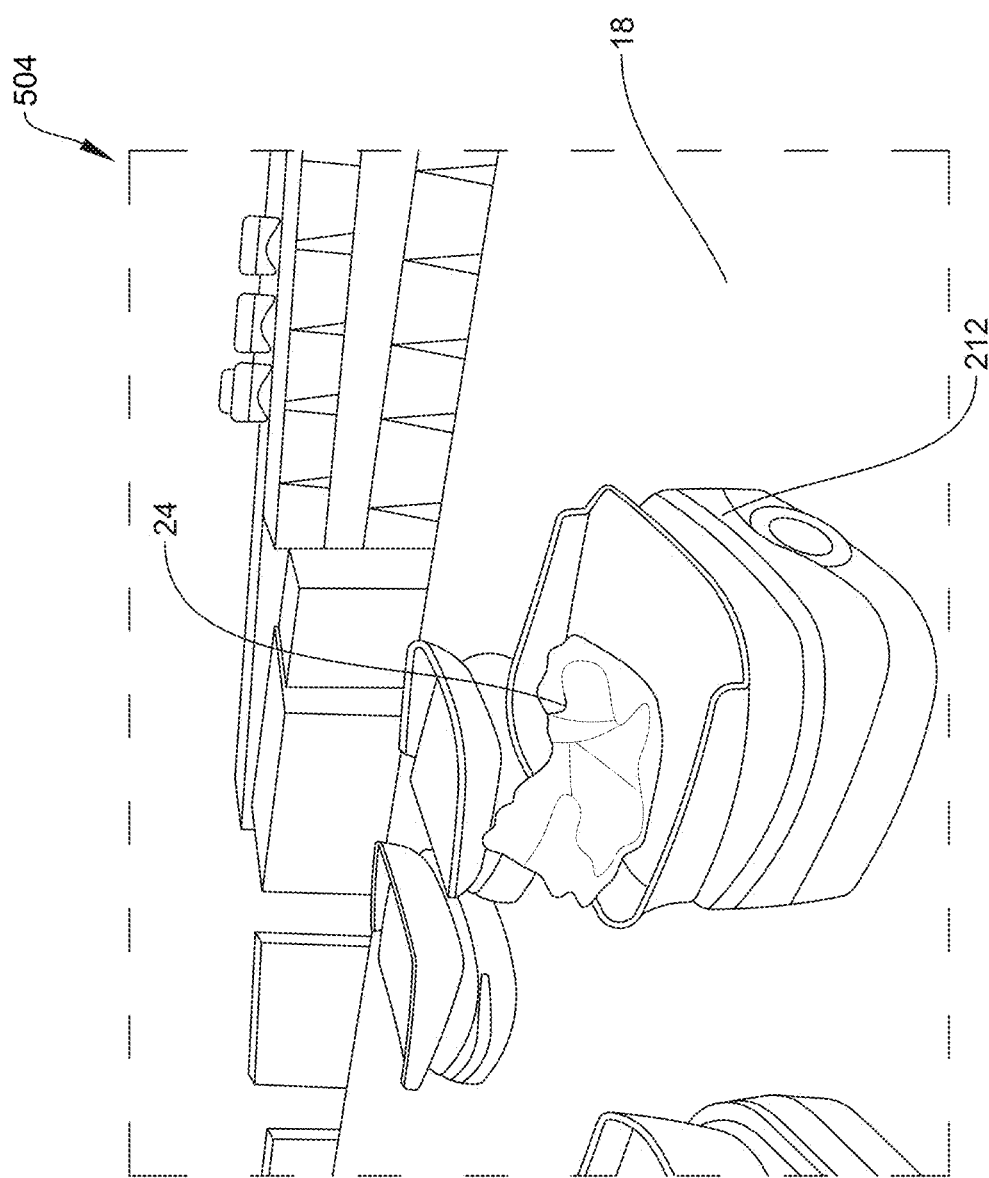
FIG. 12 illustrates a side perspective view of a portion of the second platform of FIG. 2 with a package being carried by a package computer controlled vehicle, according to at least one embodiment of the presently disclosed subject matter.
Figure 13:
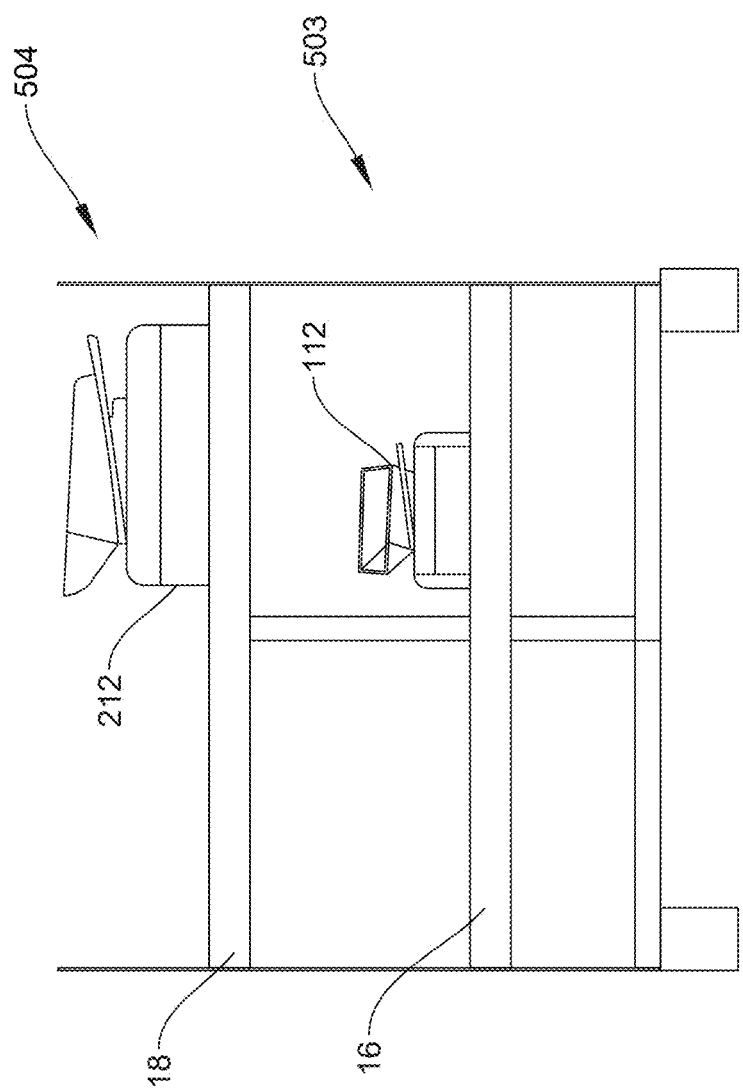
FIG. 13 illustrates a side perspective view of a portion of the first and second platforms of FIG. 2, according to at least one embodiment of the presently disclosed subject matter.

In one embodiment, during operations, server 502 directs a package computer controlled vehicle such as vehicle 212 of package sorting system 504 to travel to a position juxtaposed to an outlet of automated packaging device 555. Server 502 is further configured to direct automated packaging device 555 to discharge a package 24 created by automated packaging device 555 (by sealing a repository containing all articles 20 associated with an order) onto a carrying surface of vehicle 212. FIG. 11 shows a package 24 being output from an automated packaging device 555 onto vehicle 212, according to at least one embodiment of the presently disclosed subject matter. In one embodiment, after the package 24 is inducted onto vehicle 212, vehicle 212 travels on floor level 32 as directed by server 502. Server 502 is further configured to direct vehicle 212 to travel towards and onto elevator 512. Server 502 is also configured to direct elevator 512 to transfer the vehicle 212 from floor level 32 to the level of package sorting platform 18 spaced apart from floor level 32. FIG. 9 shows a vehicle 212 about to board elevator 512 while FIG. 10 shows a vehicle 212 exiting an elevator 512 onto package sorting platform 18. FIG. 12 shows package 24 being carried by vehicle 212 as it travels on package sorting platform 18. FIG. 13 shows a vehicle 212 on package sorting platform 18 and a vehicle 112 on article sorting platform 16. In the embodiment illustrated in FIG. 13, package sorting platform 18 is positioned right above article sorting platform 16 such that both package sorting platform 18 and article sorting platform 16 occupy a same footprint; for e.g., the footprint of package sorting platform 18 and of article sorting platform 16 occupy a same or similar square footage of the floor or ground directly below these platforms. In one embodiment, article sorting platform 16 is spaced apart from the package sorting platform 18. In one embodiment, package sorting platform 18 is arranged above or below article sorting platform 16 in a vertically stacked configuration. In one embodiment, an elevator 512 (see FIG. 9) operates to transfer a computer controlled vehicle such as an article computer controlled vehicle 112, a package computer controlled vehicle 212 or a receptacle computer controlled vehicles 312 between a floor level and a platform level such as article sorting platform 16 or package sorting platform 18.

Package 24 may comprise boxed goods, bagged goods, parcels, shipping cartons, and/or any suitable type of containers that needs sortation organization or that needs to be shipped, moved or transported to a further location. Package 24 preferably includes destination information indicating where it should be shipped. Package 24 may be subjected to automated sortation by a sorting system such as package sorting system 504 before the receptacle containing a plurality of sorted packages 24 therein or a single package 24 is transported to a further location. In one embodiment, package 24 carried on a vehicle 212 is discharged onto or delivered to a manual operator location; in one alternate embodiment, package 24 carried on a vehicle 212 is discharged onto or delivered to a computer-controlled conveyance mechanism such as computer-controlled conveyance mechanism 314. In one embodiment, server 502 is configured to assign a package receptacle 511 among a plurality of package receptacles 511, for vehicle 212 carrying a package 24 to deposit the package 24 thereto. Vehicle 212 carrying the package 24 may travel along package sorting platform 18 to a position proximate to an assigned package receptacle, as assigned by system 500 or by server 502, and the package 24 is diverted for deposition into the assigned package receptacle 511. In one example, the assigned package receptacle 511 is associated with the store, pharmacy, or a customer address to which a package 24 in the form of, for e.g., a sealed packet or package, is ultimately to be delivered. In one embodiment, a plurality of packages 24 may be deposited into a single assigned package receptacle 511 wherein the single assigned package receptacle 511 may correspond to the orders to be delivered to a local pharmacy located at, for e.g., a certain zip code. In such a case, after system 500 or server 502 determines that all packages destined for the specific local pharmacy address have been deposited into an assigned package receptacle 511, system 500 or server 502 may alert that the assigned package receptacle 511 or the contents thereof are ready for shipping out to the location of the local pharmacy. In one embodiment, server 502 may direct a receptacle computer controlled vehicle 312 to transport the package receptacle 511 to a location of further processing such as a shipping location. In one embodiment, server 502 may instead direct a vehicle 212 (instead of a vehicle 312) to transport the package receptacle 511 to a location of further processing such as a shipping location.

Figure 14:
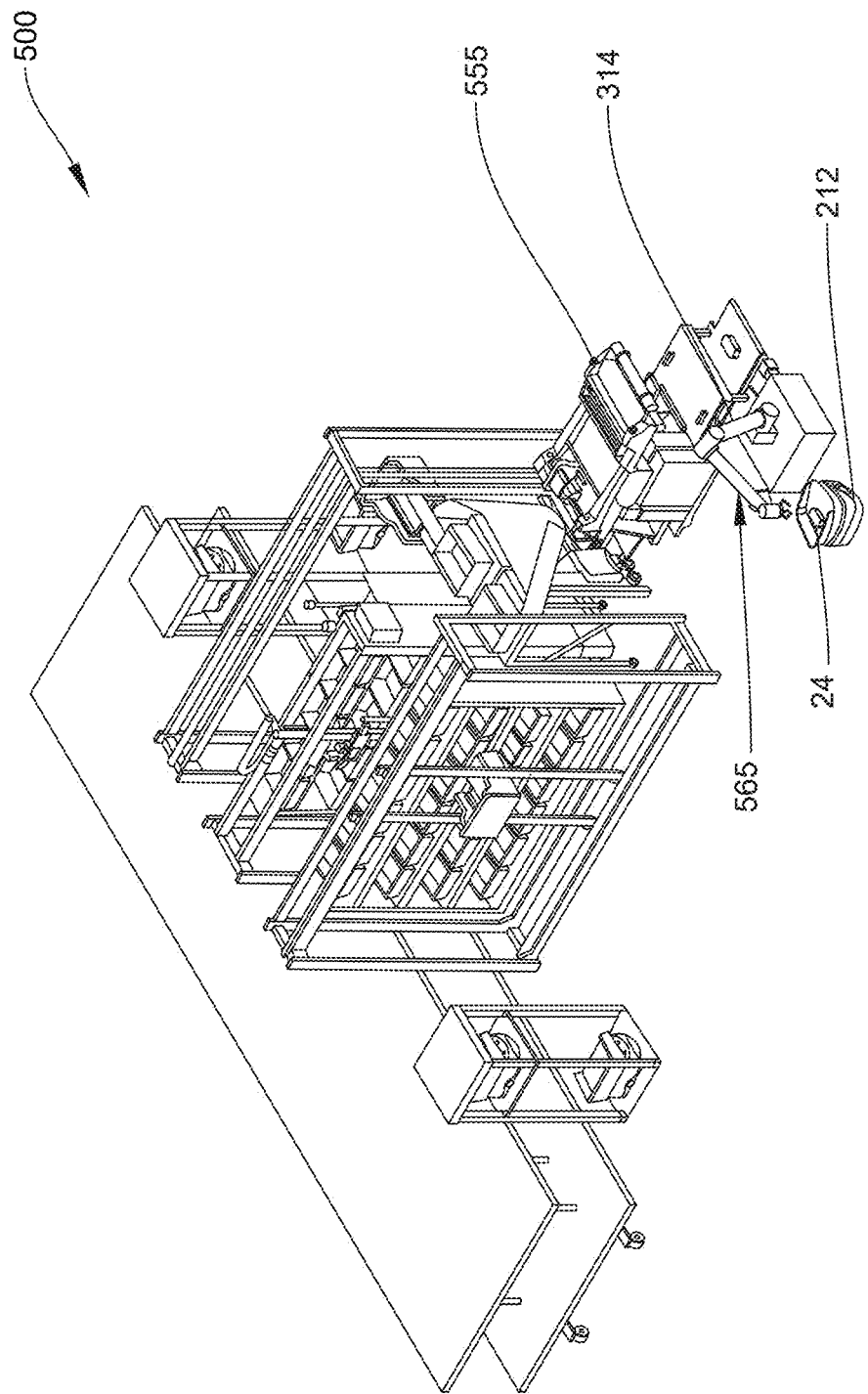
FIG. 14 illustrates a side perspective view of a portion of the system of FIG. 1 that comprises a package transfer system including a robotic arm transferring packages onto a package computer controlled vehicle, according to at least one embodiment of the presently disclosed subject matter.
Figure 15:
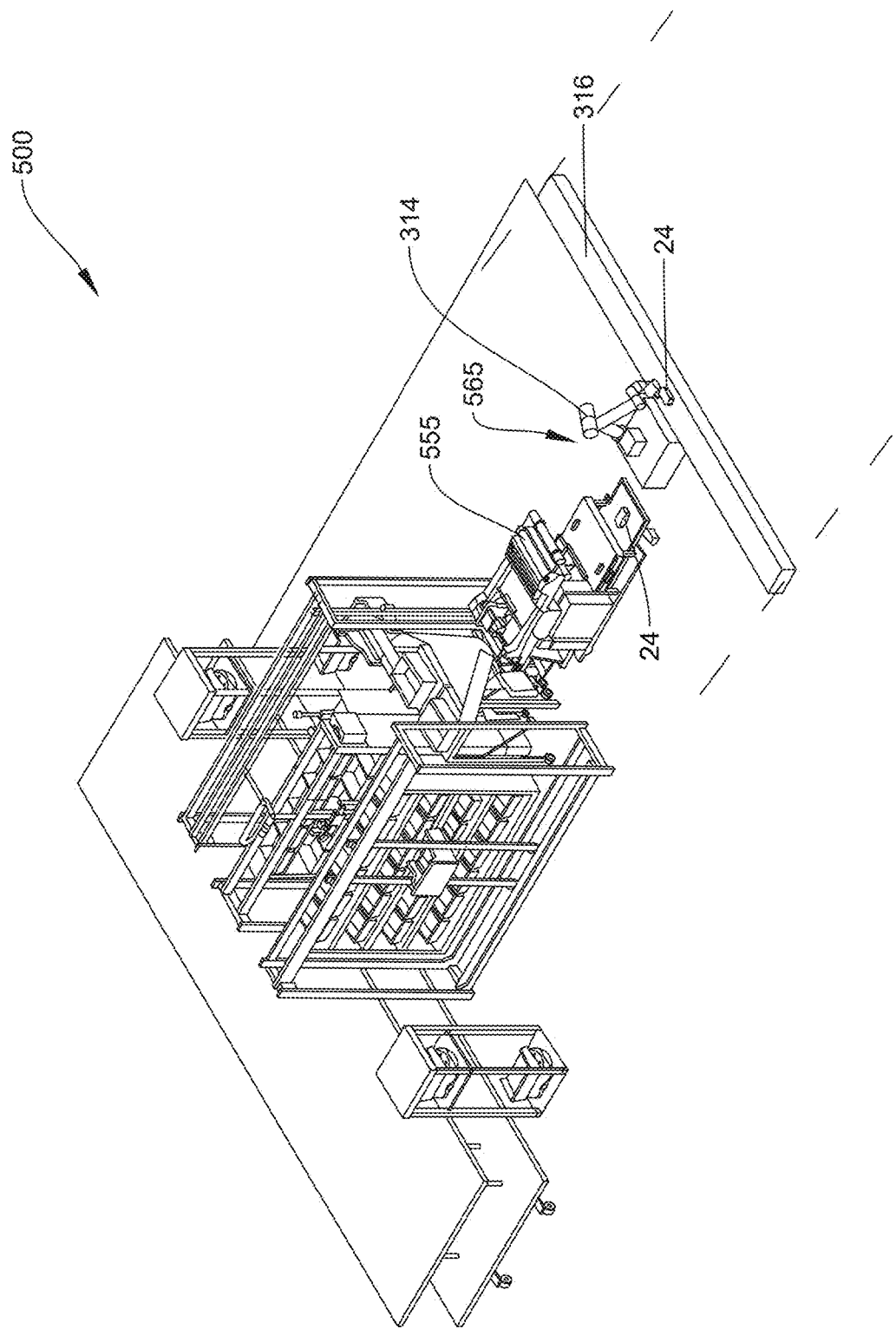
FIG. 15 illustrates a side perspective view of a portion of the system of FIG. 1 that comprises a package transfer system including a robotic arm transferring packages onto a conveyor system, according to at least one embodiment of the presently disclosed subject matter.

As illustrated, for e.g., in FIGS. 14-17, in some embodiments, a package 24 output from an outlet of automated packaging device 555 is handled by a package transfer system 565 in communication with server 502. In at least one embodiment, automated packaging device 555 comprises computer-controlled conveyance mechanism 314. For example, in one embodiment, as illustrated in FIG. 14, package transfer system 565 directs computer-controlled conveyance mechanism 314 comprising a robotic arm to transfer a package 24 that is output from automated packaging device 555 onto a vehicle 212. In one embodiment, as illustrated in FIG. 15, package transfer system 565 directs a computer-controlled conveyance mechanism 314 in the form of robotic arm to transfer a package 24 output from automated packaging device 555 onto a conveyor system 316. According to at least one embodiment, system 500 may further comprise one or more of: a conveyor, and a ramp providing access to and from the conveyor for vehicles 212 to travel thereon.

Figure 16:
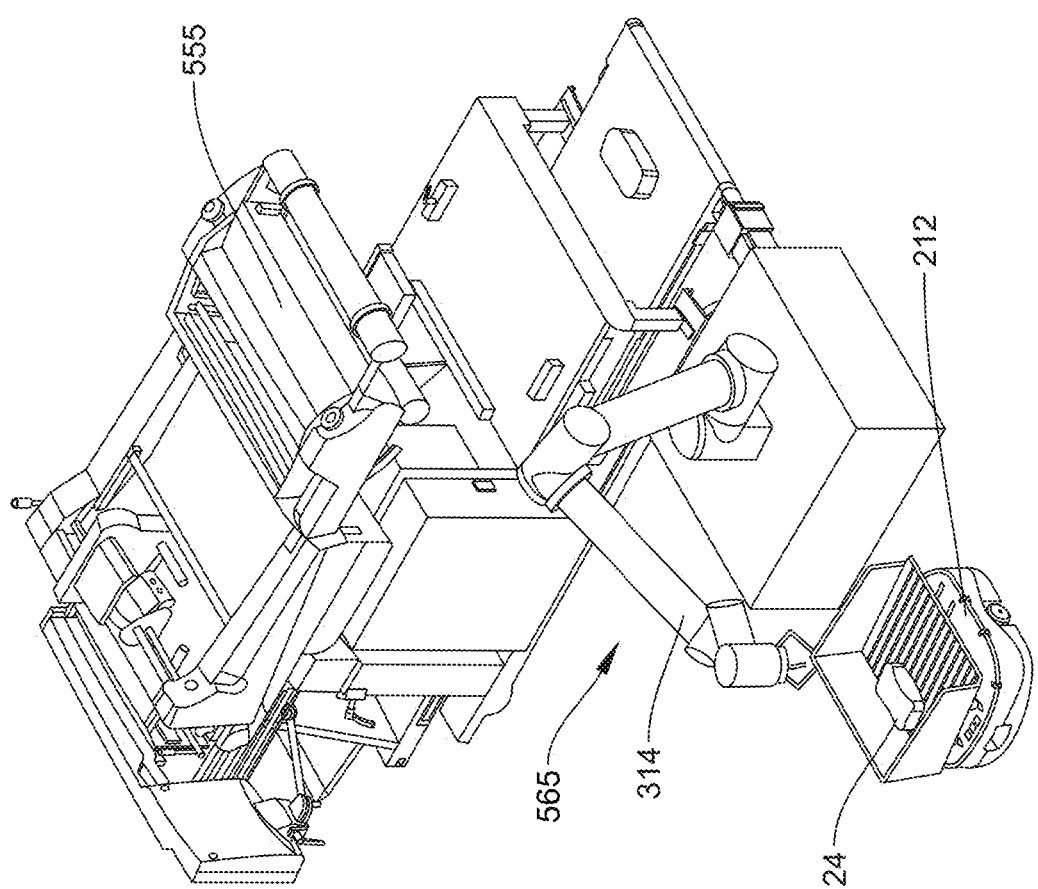
FIG. 16 illustrates a side perspective view of a system that comprises an automated packaging device, and a package transfer system including a robotic arm transferring packages onto a package computer controlled vehicle, according to at least one embodiment of the presently disclosed subject matter.

In one embodiment, as illustrated in FIG. 16, system 500 may comprise just automated packaging device 555 and package transfer system 565 as its two major components. In detail, in this embodiment, system 500 comprises: (a) automated packaging device 555 configured for creating a package 24 from articles associated with a single order; (b) a package transfer system 565 configured to direct a computer-controlled conveyance mechanism 314 to transfer a package 24 output from automated packaging device 555 onto a package computer controlled vehicle 212; (c) server 502 in communication with automated packaging device 555 and package transfer system 565; (d) a wireless access point 514; (e) article information database 513; (f) package computer controlled vehicles 212, and optionally (g) sortation engine 508. In other words, in the FIG. 16 embodiment, system 500 does not include major components such as package sorting system 504, primary sorting system 503, elevators 512, or secondary sorting system 505. In the FIG. 16 embodiment, server 502 directs package transfer system 565 to utilize computer-controlled conveyance mechanism 314, in the form of, for example, a robotic arm, to transfer a package 24 output by automated packaging device 555 onto a vehicle 212. Vehicle 212 is then directed by server 502 to transport the inducted package 24 to the location of further processing.

Figure 17:
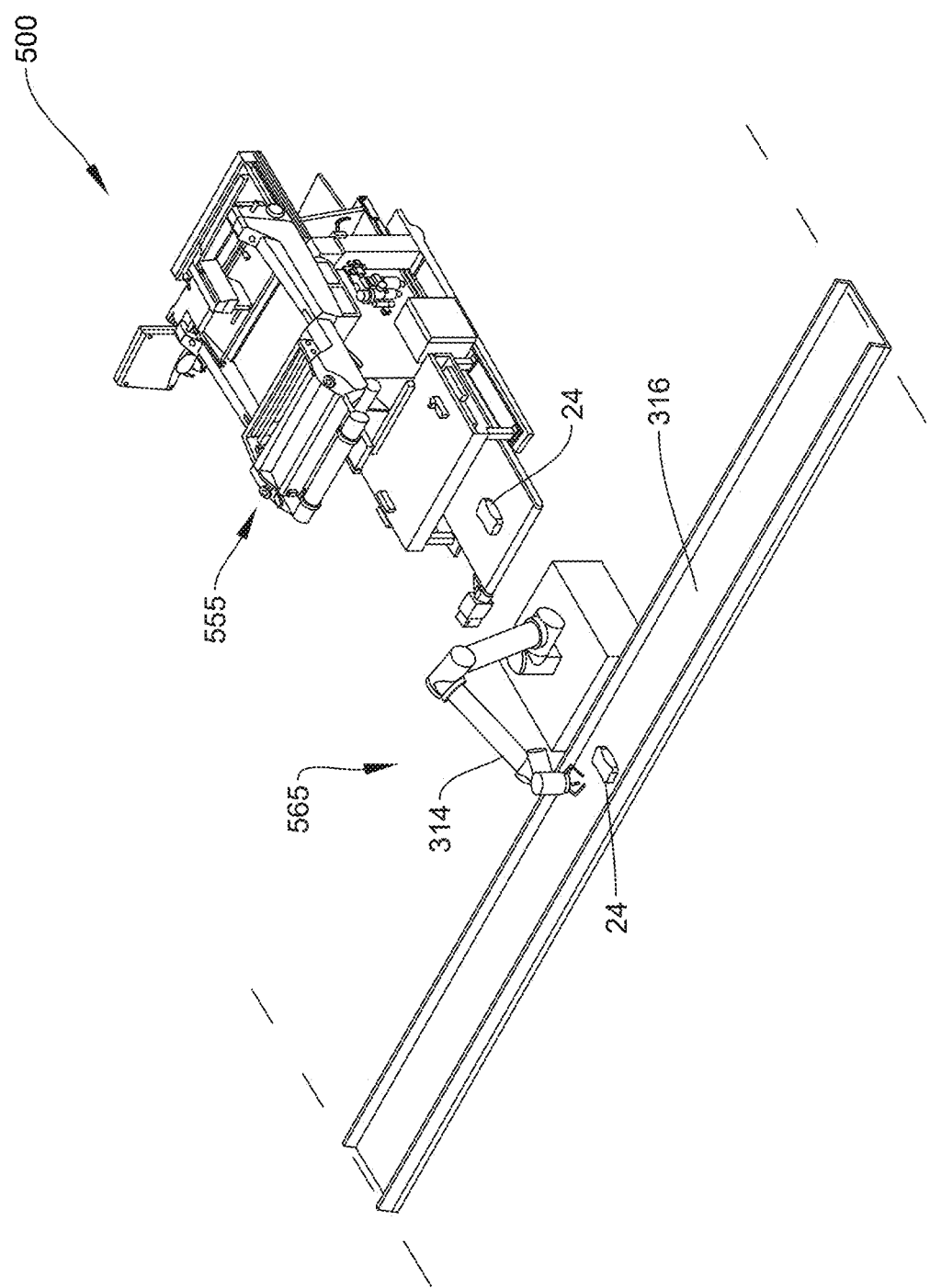
FIG. 17 illustrates a side perspective view of a system that comprises an automated packaging device, and a package transfer system including a robotic arm transferring packages onto a conveyor, according to at least one embodiment of the presently disclosed subject matter.

The FIG. 17 embodiment is similar to the FIG. 16 embodiment except for the following differences. In the FIG. 17 embodiment, computer-controlled conveyance mechanism 314, for example in the form of a robotic arm, operates to transfer a package 24 output by automated packaging device 555 onto a conveyor system 316 in the FIG. 17 embodiment; by contrast, in the FIG. 16 embodiment, package 24 output by automated packaging device 555 is transferred onto a package computer controlled vehicle 212. Conveyor system 316 of the FIG. 17 embodiment may then be directed by server 502 to transport the inducted package 24 to the location of further processing.

In various embodiments, package transfer system 565 may accordingly comprise a robotic arm (see FIGS. 14-17) configured to transfer the package 24 to one or more of: a conveyor system 316 (see FIGS. 15 and 17), and a robotic vehicle such as package computer controlled vehicle 212 (see FIGS. 14 and 16) for delivery to the post-packing sorting system. Further, in at least one embodiment, package transfer system 565 and/or computer-controlled conveyance mechanism 314 comprises a robotic arm configured to transfer the package 24 onto package computer controlled vehicle 212 for delivery to the post-packing sorting system. According to at least one embodiment, computer-controlled conveyance mechanism 314 comprises a robotic arm configured to transfer the package to one or more of: a conveyor system 316 and a package computer controlled vehicle 212 for delivery to the post-packing sorting system. According to at least one embodiment, computer-controlled conveyance mechanism 314 comprises a robotic arm configured to transfer the package onto a robotic vehicle for delivery to the post-packing sorting system. According to at least one embodiment, package transfer system 565 is configured to direct a computer-controlled conveyance mechanism 314 to transfer the package 24 from the automated packaging device 555 for delivery to a post-packing sorting system.

Figure 6:
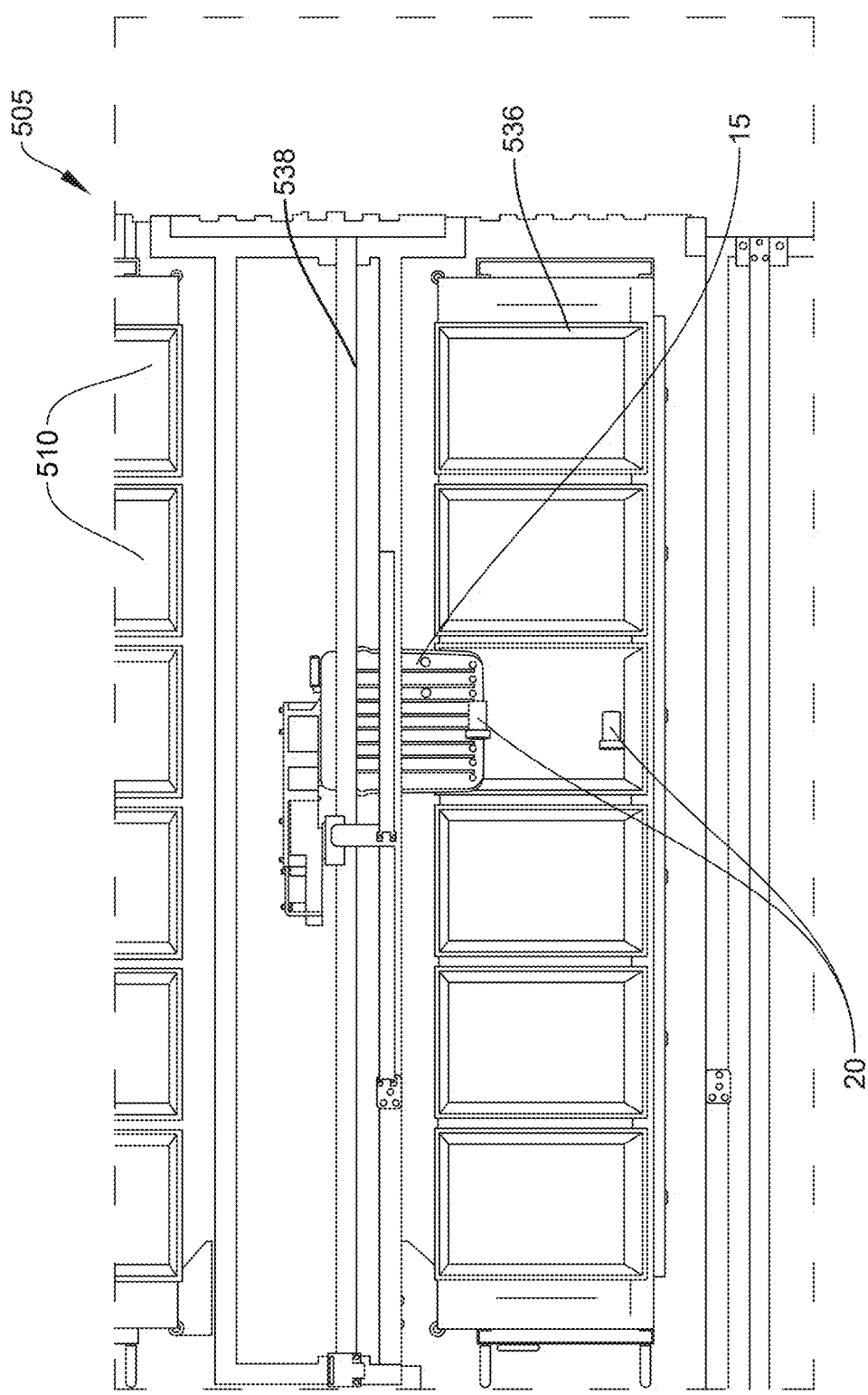
FIG. 6 illustrates a top schematic view of a portion of the secondary sorting system of FIG. 2, according to at least one embodiment of the presently disclosed subject matter.

In at least one embodiment, secondary sorting system 505 illustrated in FIG. 6 performs auto consolidation of one or more orders. As shown in FIG. 6, in one embodiment, secondary sorting system 505 comprises shelves composed of a plurality of article receptacles 510, each of the article receptacles 510 is capable of storing articles 20, and the shelves are installed at a position close to an unloading outlet. According to at least one embodiment, secondary sorting system 505 is further configured to sort, transfer or deposit one or more articles 20 associated with an order into a respective assigned article receptacle 510.

Figure 7:
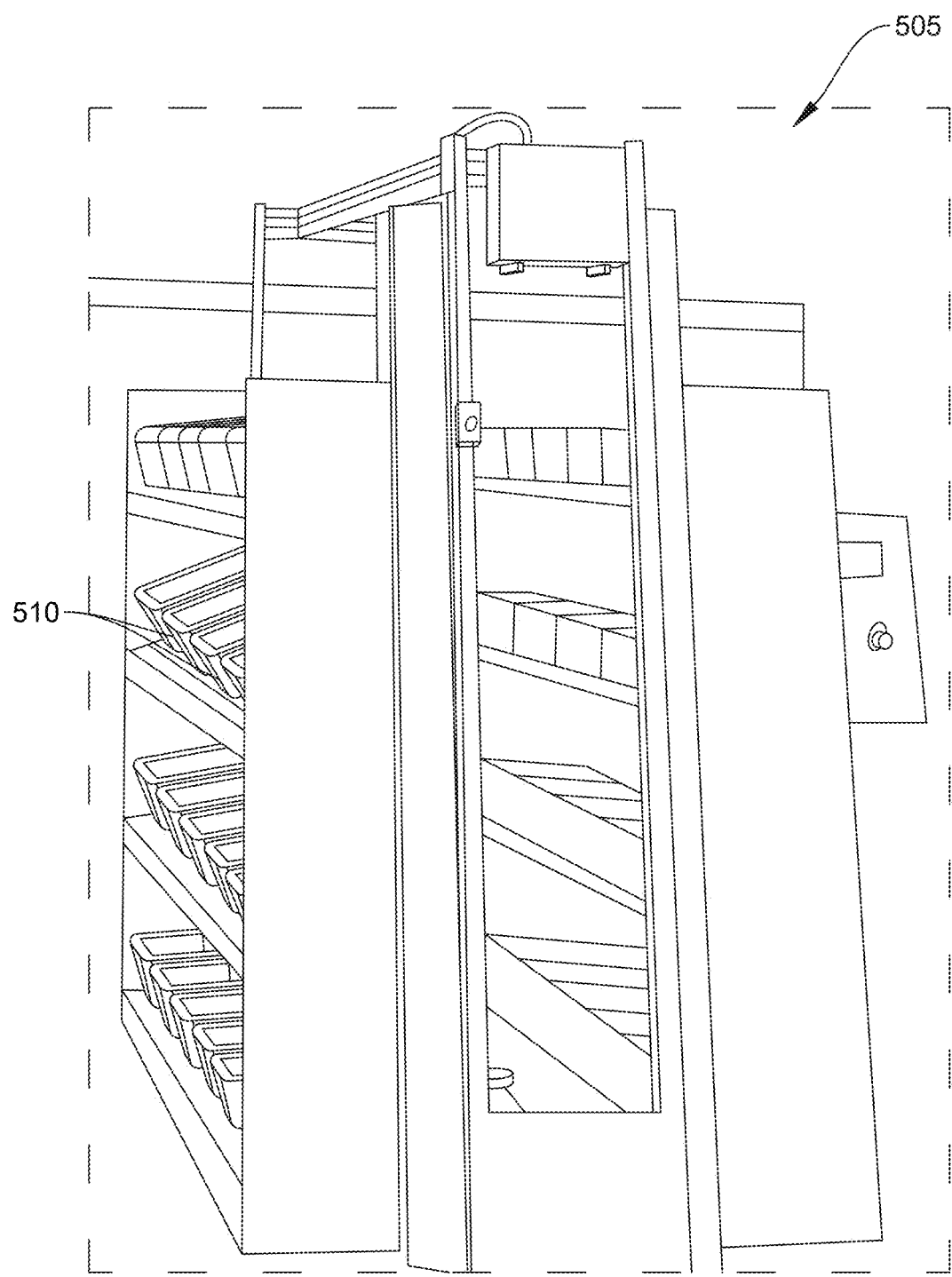
FIG. 7 illustrates a side perspective view of another embodiment of a secondary sorting system forming part of the system of FIG. 1, according to at least one embodiment of the presently disclosed subject matter.

As shown in FIG. 7, in at least one embodiment, secondary sorting system 505 performs auto consolidation of one or more orders. In one embodiment, secondary sorting system 505 receives an article 20 in the form of a prescription medication vial, for example from a vehicle 112 and consolidates all articles 20 associated with an order at an assigned article receptacle 510 wherein server 502 assigns a specific article receptacle 510 for a predetermined order. In one embodiment, secondary sorting system 505 may comprise a wall of sorting article receptacles 510 for a human or robotic operator to transfer all articles associated with an order to a respective article receptacle 510. A human or robotic operator may later on operate to transfer the articles 20 present in the respective article receptacle 510 into a bagging inlet 30 of automated packaging device 555. Accordingly, in one embodiment, an output of the put wall is provided as an input to bagging inlet 30 of automated packaging device 555. Automated packaging device 555 may receive the one or more articles 20 through an opening of a repository of the automated packaging device 555 and seal the repository to form a package 24.

Figure 8A:
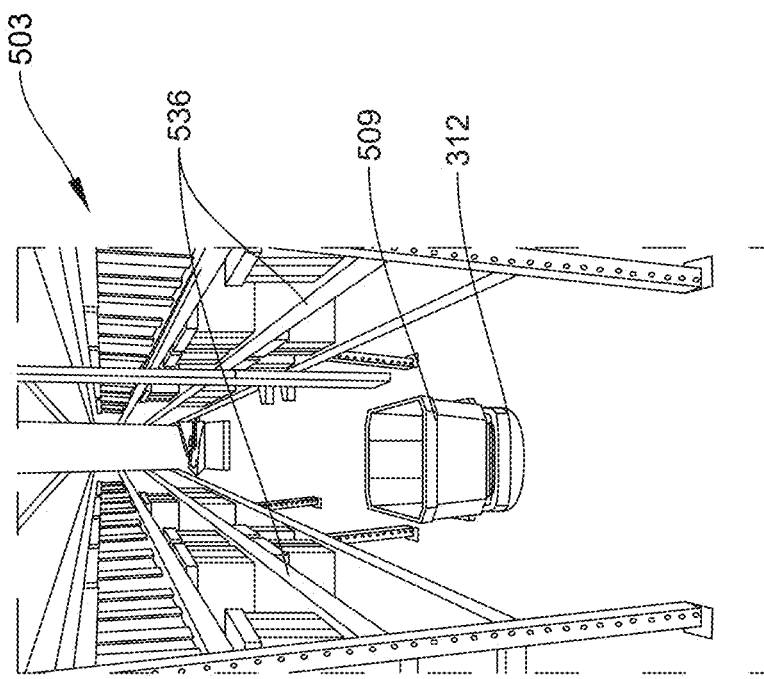
FIG. 8A illustrates a perspective view of a receptacle computer controlled vehicle traveling through an aisle of the primary sorting system of FIG. 1 for receiving an article inventory receptacle being transported by an automated article inventory receptacle lift of the primary sorting system of FIG. 1.
Figure 8B:
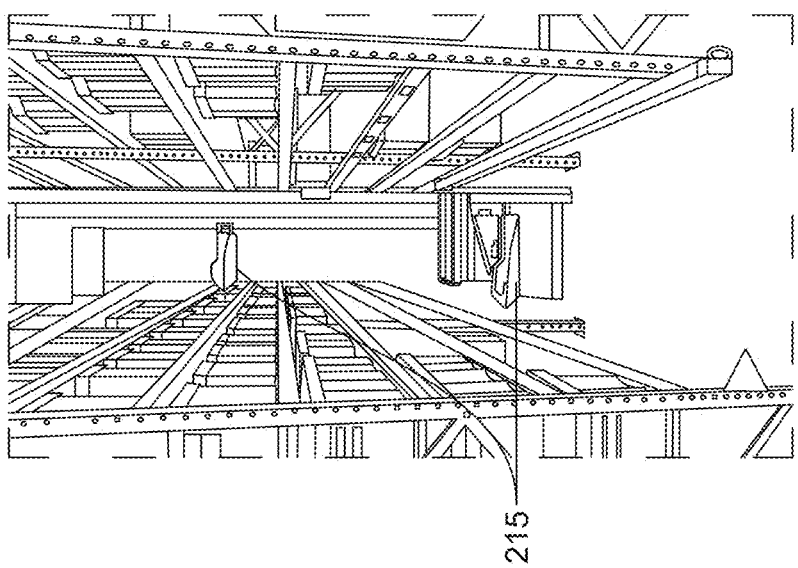
FIG. 8B illustrates a perspective view of the automated article inventory receptacle lift transporting an article inventory receptacle for delivering the same to the receptacle computer controlled vehicle; and, FIG. 8C illustrates a perspective view of the receptacle computer controlled vehicle transporting the automated article inventory receptable through an aisle of the primary sorting system of FIG. 1 for delivery to a secondary sorting system for use in a sort and ship operations, according to at least one embodiment of the presently disclosed subject matter.
Figure 8C:
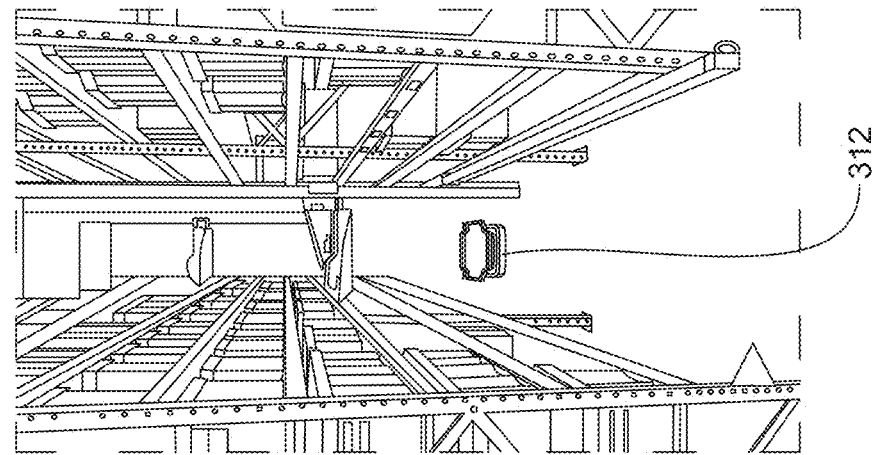

As shown in FIG. 8A-8C, in at least one embodiment, primary sorting system 503 comprises one or more sets of shelves 536, each shelf 536 comprising a plurality of storage locations arranged in one or more levels, for example, vertically in a rectangular layout. In one embodiment, primary sorting system 503 further comprises a frame positioned adjacent shelf 536. Frame comprises one or more vertical rails, one or more horizontal guide tracks, and at least one article inventory receptacle lift 215 sliding attached thereto. In one embodiment, the frame comprises article inventory receptacle lift 215 traveling about one or more vertical rails. Article inventory receptacle lift 215 is configured for transferring the article inventory receptacle 509 from an article receiving position or a receptacle receiving position to a storage location of the shelf 536. In various embodiments, one or two vertical rails translate horizontally about two horizontal guide tracks arranged parallel to one another to thereby allow article inventory receptacle lift 215 reach each of the shelves 536.

FIG. 8A illustrates a side perspective view of a receptacle computer controlled vehicle 312 traveling through an aisle of the primary sorting system 503 for receiving an article inventory receptacle 509 being transported by an article inventory receptacle lift 215 of primary sorting system 503. FIG. 8B illustrates a side perspective view of the article inventory receptacle lift 215 transporting an article inventory receptacle 509 for delivering the same to the receptacle computer controlled vehicle 312. FIG. 8C illustrates a side perspective view of the receptacle computer controlled vehicle 312 transporting the article inventory receptable 509 through an aisle of the primary sorting system 503 for delivery to an article sorting system, such as, for example, primary sorting system 503 for use in directing a sort and ship operations, according to at least one embodiment of the presently disclosed subject matter.

According to at least one embodiment, primary sorting system 503 as illustrated in FIGS. 8A-8C may output an article 20 associated with an order that is then provided as an input to secondary sorting system 505. According to an alternate embodiment, primary sorting system 503 as illustrated in FIGS. 8A-8C may output one or more articles 20 associated with an order directly to bagging inlet 30 of automated packaging device 555, thereby eliminating the need for a secondary sorting system 505; in other words, such an embodiment may only include primary sorting system 503 as illustrated in FIGS. 8A-8C but no corresponding secondary sorting system 505. In such an embodiment that does not include a secondary sorting system 505, server 502 may direct primary sorting system 503 as illustrated in FIGS. 8A-8C to transfer or deposit one or more articles associated with an order to or into the bagging inlet 30 of automated packaging device 555. Automated packaging device 555 may receive the one or more articles 20 through an opening of a repository of the automated packaging device 555 and seal the repository to form a package 24.

In various embodiments, primary sorting system 503 illustrated in FIGS. 8A-8C is configured to: determine, for e.g., by server 502, that an article inventory receptable 509 containing one or more sorted articles is ready to be transferred. System 500 is further configured to: direct, for e.g., by server 502, article inventory receptacle lift 215 to transfer article inventory receptable 509 from an article receiving position to one of: (a) a storage location of shelf 536, and (b) a position about a receptacle computer controlled vehicle 312. In one alternate embodiment, when an article 20 is required to fulfill an order as determined by server 502, article inventory receptacle lift 215, based on instructions received from server 502, transports the article 20 from an article inventory receptable 509 and deposits the article 20 onto a vehicle 312 or onto a vehicle 112 for transfer to an article lift 15 of secondary sorting system 505.

In one alternate embodiment, primary sorting system 503 such as the one illustrated in FIGS. 8A-8C operates to store package receptacles, wherein each package receptacle holds one or more packages 24 that have been output by automated packaging device 555. In such an embodiment, article inventory receptacle lift 215 is configured for transferring a package receptacle from a receptacle receiving position to a storage location of the shelf 536. In such an embodiment, vehicle 312 transports the package receptable through an aisle of primary sorting system 503 for delivery to article inventory receptacle lift 215 for storage on shelf 536. Later on, server 502 may direct the article inventory receptacle lift 215 to transfer and place the package receptacle onto vehicle 312, and vehicle 312 may then transport the package receptacle to a location of further processing, such as, for example, a shipping location. In one embodiment, primary sorting system 503 further comprises robotic pick-and-slide machines that include robotic arms equipped with grippers or suction devices to pick up items, and siding mechanisms such as conveyors or linear actuators, to move receptacles to and from a receptacle carrying surface of article inventory receptacle lift 215. Robotic pick-and-slide machines can also include sensors and vision systems to accurately identify and handle receptacles.

In some embodiments, system 500 is further configured to direct article inventory receptacle lift 215 to transfer a receptacle from a storage location of shelf 536 or from an article receiving position about package sorting platform 18 to vehicle 312. Vehicle 312 may then transport the receptacle to a location of further processing. In some embodiments, system 500 is further configured to direct article inventory receptacle lift 215 to transfer an empty receptacle carried on or by a vehicle 312 to a storage location of shelf 536 or to the article receiving position about package sorting platform 18.

In one embodiment, after article inventory receptacle lift 215 removes a receptacle, for example, from an article receiving position about package sorting platform 18, article inventory receptacle lift 215 places or puts the receptacle on a conveyance device comprising a conveyor belt. The conveyance device alternately or additionally comprises a floor-running robot such as, for e.g., vehicle 212 or vehicle 312. In one embodiment, the conveyance device operates to transfer the receptacle to a location for further processing. In one embodiment, article inventory receptacle lift 215 operates to transfer the removed receptacle to a storage location of shelf 536 for buffering. This way, when there is no conveyance device that is readily available to transport the removed receptacle, article inventory receptacle lift 215 does not need to wait. At a later time, when article inventory receptacle lift 215 does not have other tasks to perform, and a conveyance device (such as, for e.g., a conveyor belt or receptacle computer controlled vehicle 312) is available, article inventory receptacle lift 215 will then pull the "buffered" receptacle from the storage location of shelf 536 (i.e., the buffer location) and place the receptacle onto the conveyance device. In one embodiment, article inventory receptacle lift 215 further operates to remove an empty receptacle from the conveyance device and onto a shelf 536 (that holds empty receptacles for replenishment). In one embodiment, article inventory receptacle lift 215 places the empty receptacle at the empty location in an article receiving position. server 502, by locating empty receptacles near to each article inventory receptacle lift 215, ensures that the replenishment of a receptacle to a vacant location can happen quickly. Each shelf 536 may be positioned parallel to one or more receptacle banks along a sorter as shown, for e.g., in FIG. 2; alternately, each shelf 536 can also be located above sorter as shown, for e.g., in FIG. 2.

In one embodiment, the conveyance device (such as, for e.g., a conveyor belt or vehicle 312) delivers empty receptacles to a location proximal the aisle where article inventory receptacle lift 215 is located so that article inventory receptacle lift 215 can pick up the empty receptacles and transfer them into or to storage location of shelf 536 to be held until needed. Server 502 directs this task of picking up the empty receptacles and transferring them into storage location of shelf 536 when there are no other tasks related to completed-article receptacle for article inventory receptacle lift 215 to perform at that time. In various embodiments, receptacle bank provided as part of system 500 comprises one or more chambers or spaces with each space configured for receiving a receptacle. In one embodiment, a receptacle computer controlled vehicle 312 provided as part of system 500 operates to directly unload filled receptacles carried on receptacle bank, and vehicle 312 may further operate to transport empty receptacles that are to replace the filled receptacles. In some embodiments, article inventory receptacle lift 215 operates to load and unload receptacles carried on receptacle bank.

System 500 comprises, or is in communication with, an article information database 513 and with server 502 of system 500. System 500 is configured to use data available at article information database 513. In some embodiments, based on the data available at article information database 513, server 502 is further configured to optimize the total distance that needs to be traveled by one or more transport devices or vehicles to fill a particular receptacle such that the total distance traveled by all transport devices or vehicles to fill that receptacle is minimized whenever possible. For example, in one implementation, a destination that is expected to receive the greatest number of articles therein is assigned to one or more receptacles that are located closest to an article induction point; this advantageously ensures that the multiple trips needed to fill a particular high demand destination involve the shortest travel durations or the shortest (one-way or two-way) travel distances.

In various embodiments, vehicles 112, 212, 312 can comprise an automated mobile robot (AMR), a computer-controlled vehicle, a track-arranged device, an overhead transport device, a pedestal robot, a personal AMR, a pick assist AMR, an automated conveyor system, or any similar automated transport or transfer device. In at least one embodiment, vehicle 112, 212, 312 traverses a first surface, floor area, platform, or a track arrangement. In some embodiments, vehicles 112, 212, 312 may comprise a conveyor. FIG. 2 depicts an example automated transport device such as vehicle 112, 212, 312 traveling on a platform for carrying, moving, or transporting an article such as article 20 or package 24 to be sorted to a receptacle.

Herein, reference made to "article" characterizes the objects subjected to sortation by a sorting system. An article can be any suitable type of object such as a package, a parcel, a product, raw material good (e.g., a manufactured part), and/or any suitable type of object that needs sortation organization. In the case of shipping or other operational contexts, an article may have various properties. In a parcel processing center, articles could be, for example: boxed goods, bagged goods, and/or parcels. An article could carry destination information indicating where it should be shipped. An article could carry information that could correspond to a stock keeping unit (SKU) identifier or an alternative product identifier.

Herein, reference made to "package" characterizes the packages that contain one or more articles and include information on indicia found thereon to facilitate shipping or transport of the package to a different or further location from the place where the package is created. A package such as package 24 is formed by an automated packaging device 555.

Figure 21:
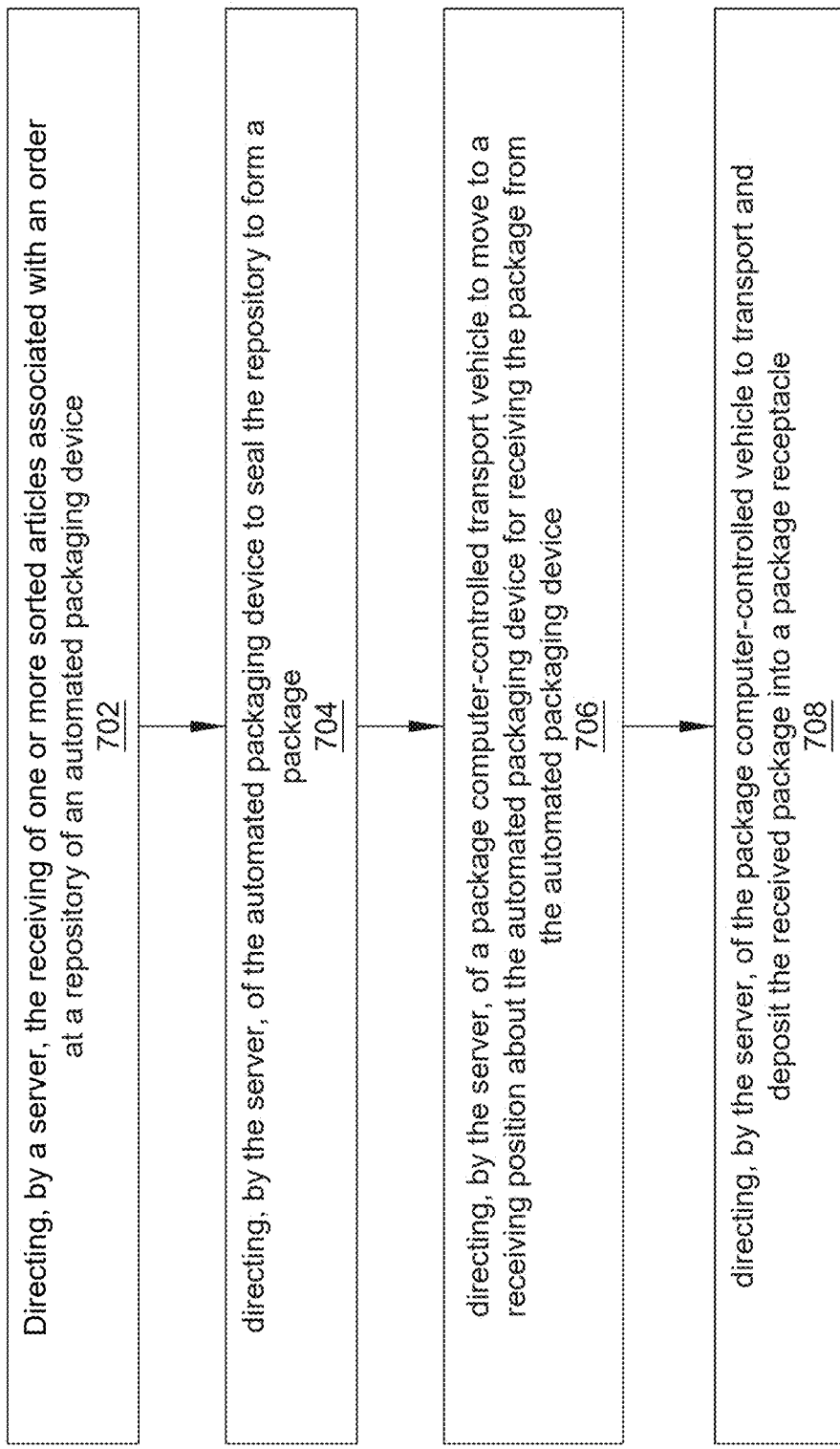
FIG. 21 depicts a flowchart of an exemplary implementation of an improved system for use in directing a sort and ship operations, for e.g., in a centralized or localized sorting facility, according to one or more implementations of the presently disclosed subject matter.

FIG. 21 depicts a flowchart of an exemplary implementation of an improved system for use in directing a sort and ship operations, for e.g., in a centralized or localized sorting facility, according to one or more implementations of the presently disclosed subject matter. In one embodiment, as shown in FIG. 21, a method of implementing an improved system for use in directing a sort and ship operations may comprise, at step 702, directing, by a server, the receiving of one or more sorted articles associated with an order at a repository of an automated packaging device. The method may further comprise, at step 704, directing, by the server, of the automated packaging device to seal the repository to form a package. The method may furthermore comprise, at step 706, directing, by the server, of a package computer-controlled vehicle to move to a receiving position about the automated packaging device for receiving the package 24 from the automated packaging device. The method may also comprise, at step 708, directing, by the server, of the package computer-controlled vehicle to transport and deposit the received package 24 into a package receptacle.

Figure 22:
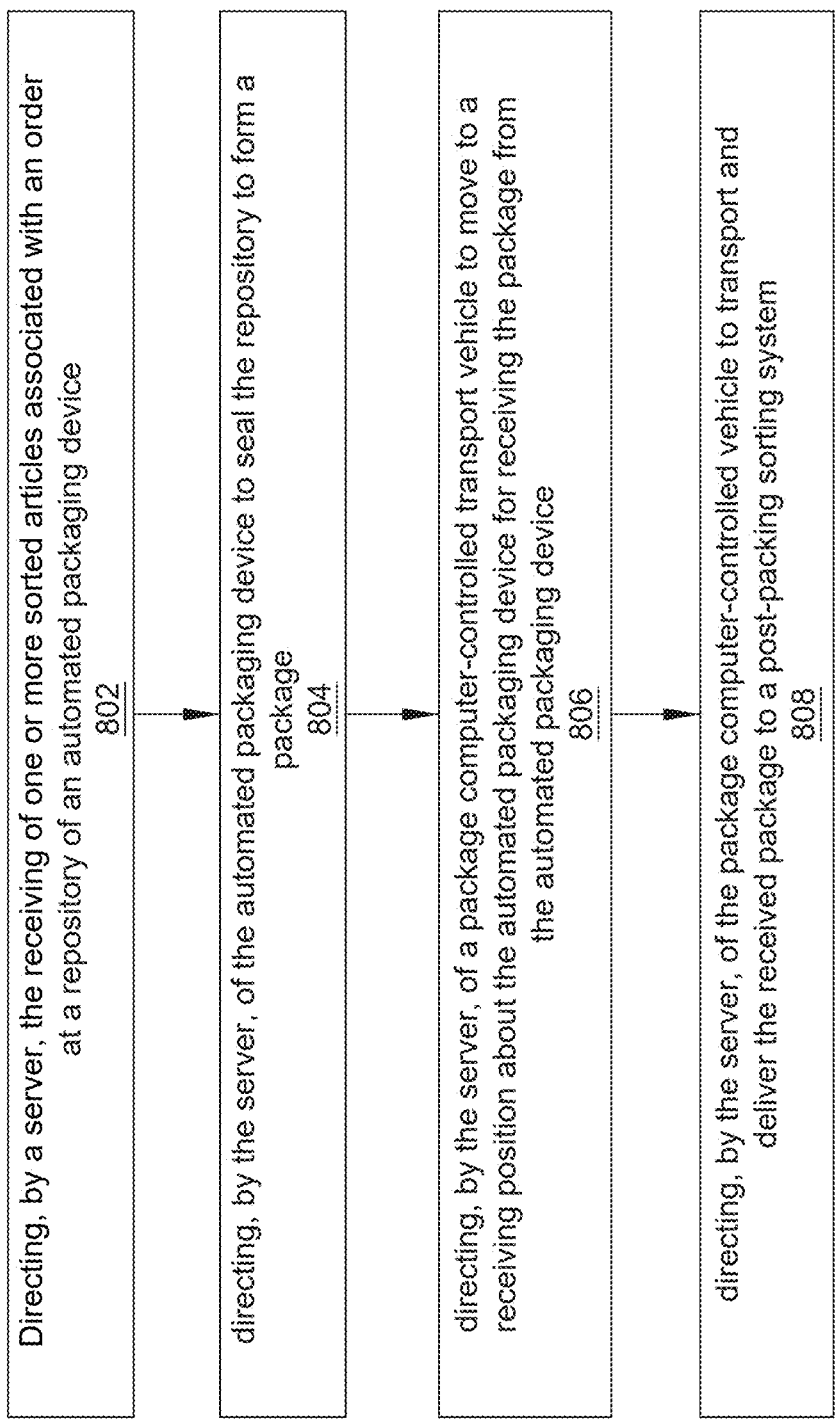
FIG. 22 depicts a flowchart of an exemplary implementation of an improved system for use in directing a sort and ship operations, for e.g., in a centralized or localized sorting facility, according to one or more implementations of the presently disclosed subject matter.

FIG. 22 depicts a flowchart of an exemplary implementation of an improved system for use in directing a sort and ship operations, for e.g., in a centralized or localized sorting facility, according to one or more implementations of the presently disclosed subject matter. In one embodiment, as shown in FIG. 22, a method of implementing an improved system for use in directing a sort and ship operations may comprise, at step 802, directing, by a server, the receiving of one or more sorted articles associated with an order at a repository of an automated packaging device. The method may further comprise, at step 804, directing, by the server, of the automated packaging device to seal the repository to form a package. The method may also comprise, at step 806, directing, by the server, of a package computer-controlled vehicle to move to a receiving position about the automated packaging device for receiving a package 24 from the automated packaging device. The method may additionally comprise, at step 808, directing, by the server, of the package computer-controlled vehicle to transport and deliver the received package 24 to a post-packing sorting system.

Figure 23:
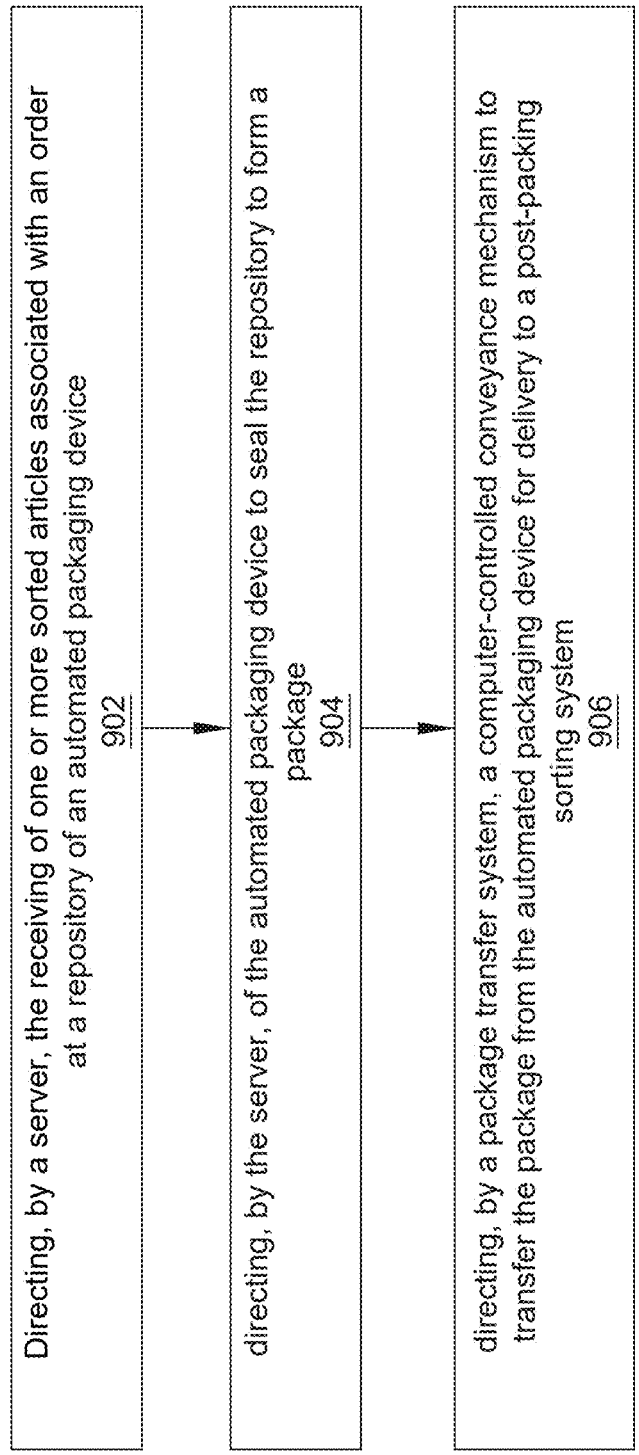
FIG. 23 depicts a flowchart of an exemplary implementation of an improved system for use in directing a sort and ship operations, for e.g., in a centralized or localized sorting facility, according to one or more implementations of the presently disclosed subject matter.

FIG. 23 depicts a flowchart of an exemplary implementation of an improved system for use in directing a sort and ship operations, for e.g., in a centralized or localized sorting facility, according to one or more implementations of the presently disclosed subject matter. In one embodiment, as shown in FIG. 23, a method of implementing an improved system for use in directing a sort and ship operations may comprise, at step 902, directing, by a server, the receiving of one or more sorted articles associated with an order at a repository of an automated packaging device. The method may further comprise, at step 904, directing, by the server, of the automated packaging device to seal the repository to form a package. The method may also comprise, at step 906, directing, by a package transfer system, a computer-controlled conveyance mechanism to transfer the package 24 from the automated packaging device for delivery to a post-packing sorting system.

According to at least one embodiment, system 500 for packing and sorting comprises: server 502 comprising a memory, a processor, and a sortation engine 508, and an automated packaging device 555. Automated packaging device 555 is configured for: receiving one or more articles 20 through an opening of a repository of the automated packaging device 555, and sealing the repository to form a package; and, a package sorting system configured to: direct a package computer controlled vehicle 212 to move to a receiving position about the automated packaging device for receiving the package 24 from the automated packaging device, and direct the package computer controlled vehicle 212 to transport and deliver the received package 24 to a post-packing sorting system. The system, wherein one of: an elevator transfers the package computer controlled vehicle 212 from a floor level to a package sorting platform spaced apart from the floor level; or the package computer controlled vehicle 212 deposits the package 24 at a lift of a post-packing sorting system. The system, further comprising: a primary sorting system configured to deliver the one or more articles to a secondary sorting system 505; the secondary sorting system 505 configured to consolidate the one or more articles associated with an order to an article receptacle, and an article receptacle transport system configured to direct a receptacle computer controlled vehicle to transport the article receptacle to a delivery position about the automated packaging device.

According to at least one embodiment, System 500 comprises a system for consolidation of articles 20 into an order such as primary sorting system 503. In one embodiment, in addition to or in lieu of primary sorting system 503, such a system for consolidation of articles into an order comprises a put wall. As used herein, "put wall" refers to a series of dedicated shelving that increase efficiency during the order consolidation process. Put walls can handle a large volume of orders in a small footprint by allowing a human operator 14 to manually put items into one selected article receptacle 510 (among several article receptacles 510) with the article receptacles 510 taking the form of cubbies on the wall, each cubby being associated with one order. In one embodiment, server 502 may direct the operators to deposit of all articles associated with the same order into a predetermined cubby, i.e., a predetermined article receptacle 510. This process streamlines the supply chain by increasing order accuracy and reducing walking to and from inventory storage. In one embodiment, outputs of primary sorting system 503 is provided as an input for operators to sort into a wall of sorting cubbies (e.g., a put wall) in the form of article receptacles 510 for an operator to transfer all articles associated with each customer order to a respective sorting cubby. Once server 502 or a human operator determines that all articles 20 associated with an order have been deposited into an assigned cubby (i.e., article receptacle 510) thereby rendering it a completed order article receptacle 510, server 502 or the human operator may then initiate the transport of the assigned article receptacle 510 in order or otherwise initiate the deposition of all articles 20 contained within assigned article receptacle 510 (i.e., the assigned cubby) into a bagging inlet 30 of automated packaging device 555. Accordingly, in one embodiment, an output of the put wall is provided as an input to bagging inlet 30 of automated packaging device 555. Automated packaging device 555 may receive one or more articles 20 through an opening of a repository of the automated packaging device 555 and seal the repository to form a package 24. Package transfer system 565 may then direct a computer-controlled conveyance mechanism 314 to transfer the package 24 from the automated packaging device 555 for delivery to a post-packing sorting system.

According to at least one embodiment, an output of the primary sorting system 503 is provided as an input to the package sorting system 504. According to at least one embodiment, the output of the package sorting system 504 is provided as an input to the primary sorting system 503. According to at least one embodiment, primary sorting system 503 is configured for order consolidation. According to at least one embodiment, package sorting system 504 is configured for consolidating for parcel sortation. According to at least one embodiment, primary sorting system 503 is configured for store pick-up ecommerce sortation and package sorting system 504 is configured for store replenishment sortation. According to at least one embodiment, primary sorting system 503 is configured for sorting of consumer goods to automated packaging device 555, and package sorting system 504 is configured for sorting of an output of automated packaging device 555 to one of: shipping containers and gaylords.

According to at least one embodiment, system 500 further comprises a third function sorting system that comprises one or of a: conveyor, robotic arm, floor running robots and similar other sorting mechanisms. According to at least one embodiment, an output of primary sorting system 503 and an output of package sorting system 504 are combined and provided as an input to the third function sorting system. According to at least one embodiment, outputs of one or more of primary sorting system 503 and package sorting system 504 are provided as an input to the third function sorting system. According to at least one embodiment, primary sorting system 503 is configured for sorting of articles 20 above a threshold size, and package sorting system 504 is configured for sorting of articles below the threshold size. The threshold size may comprise one or more physical attributes such as length, width, height, volume, surface area, density, weight, and similar other physical attributes of the article.

According to one embodiment, the primary sorting system 503 is configured for sorting of articles above (or below) a threshold size, the package sorting system 504 is configured for sorting of articles below (or above) the threshold size, and the outputs of the first and package sorting systems are provided as an input for placing into a put wall.

According to at least one embodiment, outputs of one or more of the primary sorting system 503 and package sorting system 504 are provided as an input to a wall of sorting cubbies for an operator to transfer all articles associated with each customer order to a respective sorting cubby. In one embodiment, secondary sorting system comprises the wall of sorting cubbies. According to at least one embodiment, outputs of one or more of the primary sorting system 503 and package sorting system 504 are provided as an input to a conveyor or a lift for delivery to a third function sorting system. According to at least one embodiment, outputs of one or more of the primary sorting system 503 and package sorting system 504 are provided as an input to an induction lift for delivery to a third function sorting system. According to at least one embodiment, outputs one or more of the primary sorting system 503 and package sorting system 504 are provided as an input to a single belt conveyor positioned adjacent to a floor level for delivery to an automated packaging device 555. According to at least one embodiment, an output of automated packaging device 555 is provided as an input to a lift for delivery to the third function sorting system configured for parcel sorting. According to at least one embodiment, the primary sorting system 503 is configured for item sortation and package sorting system 504 is configured for parcel sortation, wherein an output of primary sorting system 503 is provided as an input to package sorting system 504, and wherein an output of package sorting system 504 is provided as input to automated packaging device 555. According to at least one embodiment, an output of primary sorting system 503 is provided as an input to a lift for delivery to package sorting system 504 configured for ecommerce order fulfillment. According to at least one embodiment, outputs of one or more of primary sorting system 503 and package sorting system 504 are provided as an input to a lift for delivery to the third function sorting system configured for store replenishment. According to at least one embodiment, system 500 further comprises a light curtain provided at one or more of: article inventory receptacles 509, package receptacle 511, article computer controlled vehicles 112, and package computer controlled vehicles 212. According to at least one embodiment, system 500 further comprises one or more article information acquisition devices electronically coupled to server 502.

According to at least one embodiment, primary sorting system 503 is configured for store pick-up ecommerce sortation, and package sorting system 504 is configured for store replenishment sortation. According to one embodiment, primary sorting system 503 is configured for sorting of consumer goods such as, for e.g., apparel to automated packaging device 555, and the package sorting system 504 is configured for sorting of an output of the automated packaging device 555 to one of: shipping containers and gaylords. According to one embodiment, an output of the primary sorting system 503 and an output of the package sorting system 504 are combined together and provided as an input to a third function sorting system. According to one embodiment, an output of one of the primary sorting system 503 and the package sorting system 504 is provided as an input to a third function sorting system; according to one embodiment, the third function sorting system is configured for parcel sortation. According to one embodiment, an output of the package sorting system 504 is provided as an input to a conveyor or a lift for delivery to the third function sorting system. According to one embodiment, an output of the package transfer system 565 is provided as an input to a conveyor or a lift for delivery to the third function sorting system.

According to one embodiment, system 500 further comprises an induction lift for the transfer/delivery of articles 20 or packages 24 from one component or sub-system of system 500 to another sub-system of system 500. As used herein, "induction lift" refers to an induction system including a lift for carrying an inducted item to a different level than the inducted level where a different sub-system comprising components such as, for example, AMRs, conveyors, or similar other material transfer or material handling systems can move or carry the inducted item to an intended location. The induction into the induction lift can be performed in an automated manner by a sub-system of system 500 or manually by a human operator. The induction lift may have the ability to go up to 5 platform sortation levels high to further reduce the footprint of the overall system. The induction lift operates to generate more volume in a multi-level platform sorting system as AMRs can be spread across a larger surface area. This allows greater throughput capabilities and creates larger batch pick opportunities for an order fulfillment system since the lift eliminates the need to create separate batches for each level. According to one embodiment, an output of package sorting system 504 is provided as an input to an induction lift for delivery to a third function sorting system configured for parcel sorting. According to one embodiment, an output of package transfer system 565 is provided as an input to an induction lift for delivery to a third function sorting system configured for parcel sorting.

According to one embodiment, an output of package transfer system 565 is provided as an input to a single belt conveyor system such as conveyor system 316 positioned adjacent to a floor level for delivery to automated packaging device 555. In one embodiment, a single belt conveyor may be positioned close to the floor level whereby in one embodiment the single belt conveyor is positioned right below the article sorting platform 16 or package sorting platform 18. According to one embodiment, an output of automated packaging device 555 is provided as an input to an induction lift for delivery to the third function sorting system configured for parcel sorting. According to one embodiment, an output of primary sorting system 503 is provided as an input to an induction lift for delivery to the third function sorting system configured for parcel sorting. According to one embodiment, the primary sorting system 503 is configured for item sortation and the package sorting system 504 is configured for parcel sortation, wherein an output of the primary sorting system 503 is provided as an input to the package sorting system 504, and optionally wherein an output of the package sorting system 504 is provided as input to automated packaging device 555. According to one embodiment, an output of the primary sorting system 503 is provided as an input to an induction lift for delivery to the package sorting system 504 configured for ecommerce order fulfillment. According to one embodiment, an output of the primary sorting system 503 is provided as an input to an induction lift for delivery to the third function sorting system configured for store replenishment.

In at least one embodiment, the primary sorting system is configured for sorting of articles to be assembled into a finished product, and the package sorting system 504 is configured for parcel sortation. In at least one embodiment, the primary sorting system is configured for sorting of articles into a route stop sequence, and the package sorting system 504 is configured for sorting of the output of the primary sorting system to a route comprising the route stop sequence. In at least one embodiment, the primary sorting system is configured for sorting of articles comprising consumer goods such as, for example, apparel to an automated packaging device, and the package sorting system 504 is configured for sorting of the output of the primary sorting system to one of shipping containers and gaylords.

In at least one embodiment, system 500 is configured for calculating cubic footage of all articles present in each of the article receptacles and in each of the second sort receptacles.

In one embodiment, system 500 includes two sorters' outputs flowing into one sorter integrated at the other end of the two sorters (for e.g., third sorter adjacent to the 2nd sorter). In one embodiment, the multi-function sorter system further includes unit sortation of different product sizes are performed on a two-level sorter which feeds directly into an adjacent parcel sorter. In one embodiment, the multi-function sorter system advantageously includes a sequencing sorter. In one embodiment, the multi-function sorter operates to sort an item to a 3D sorter at a bottom level. Then a conveyor or lift operates to move the item to a further sorting system such as, for e.g., carried to the top to be inducted into a 3rd system. In case of an automated packaging device, a conveyor or lift operates to lift the item to 2nd level for parcel. In one embodiment, system 500 comprises a single belt at the bottom plus induction lift whereby an operator scoots a parcel just after being packed onto the belt and the induction lift takes it to the parcel sort level. In one embodiment, system 500 comprises a multi-level induction set up whereby items or articles are inducted to vertical sorting system. The lift takes the item to a certain level (e.g., a $2^{nd}$ level, a $3^{rd}$ level, a $4^{th}$ level, etc.) based on the type of sort required (e.g., an ecommerce sort versus a store replenishment sort).

According to one embodiment, system 500 further comprises a photoelectric sensor such as, for e.g., a light curtain, provided at each receptacle, such as, article receptacle 510, article inventory receptacle 509, and package receptacle 511. In one embodiment, the light curtain operates to confirm whether a positive deposition of an article from a lift or from a vehicle (such as, for e.g., article computer controlled vehicles 112 or package computer controlled vehicles 212) into a receptacle (such as, for e.g., article receptacle 510) has occurred or not. In one embodiment, every one of the receptacles is provided with light curtain facilities. In one embodiment, the light curtain is installed outside of the receptacle in order that it can properly track the filling of the receptacles. System 500 is in communication with light curtains such that system 500 is aware of the filling rate of each receptacle as well as when an article receptacle 510 is full and therefore in need of replacement.

According to one embodiment, system 500 comprises a light curtain provided at each of the article computer controlled vehicles 112 and the package computer controlled vehicles 212. These light curtains may operate to confirm whether a positive deposition of an article from the transport vehicle into a receptacle has occurred or not; these light curtains may operate to track the filling of receptacles such as article receptacle 510. System 500 is in wireless or wired communication with the light curtains aboard the transport vehicles such that system 500 is aware of the filling rate of each article receptacle 510 as well as when an article receptacle 510 is full and therefore in need of replacement.

In one embodiment, the information acquisition device comprises a scanning device, e.g., a RFID reader, capable of detecting and acquiring information (e.g., in form of a bar-code) present on a tag such as tag 22 coupled to article 20. In one embodiment, tag 22 comprises a RFID (Radio-frequency Identification) associated with the article 20. In one embodiment, information acquisition device includes a barcode reading device, a CCD (charged-coupled device) camera, or a similar other device. In various embodiments, information acquisition device is configured to capture a numerical count and other parameters of the specific units of a material, e.g., pills, contained in each article 20 as well as the production lot number and expiry date of the material contained in article 20. Thus, it is possible to detect and double-check whether article 20 actually contains the actual units of material (with respect to both the parameters and the number of units of the material) to which article 20 corresponds. Also, it is possible to detect and double-check whether article 20 contains materials belonging to a lot that has been recalled or otherwise is blocked from getting distributed. And, additionally, it may be detected and double-checked that the actual date of distribution is well before the expiration date of the material so that there is a sufficient period left before the expiration date. These data can be archived so that in the extremely rare case of a recall these data can be retrieved from a database. Such features may be advantageous with medical prescriptions and other medicines being sorted for delivery.

In various embodiments, system 500 may further comprise labeling stations, shipping stations, loading docks and similar other components as found in typical centralized warehouse sorting systems as a person of skill in the art would readily understand, such components not shown or described herein for the sake of brevity.

According to various embodiments of the presently disclosed subject matter, a method of directing a medication sorting operation by system 500 or server 502 comprises acquiring, by an information acquisition device, of an article information from a tag coupled to an article. The method further comprises receiving, at a server, of the article information acquired by the information acquisition device. The method further includes determining, by the server, of an article receptacle among a plurality of article receptacles for an article computer controlled vehicle to transport and deposit the article thereto based on the article information. The method also comprises acquiring, by an information acquisition device, of an article information from the tag coupled to the article prior to the deposition of the article into a receptacle. The method further comprises receiving, at the server, of the article information acquired by the information acquisition device. The method furthermore comprises comparing, by the sortation engine, of the article information against the article information. The method also comprises directing, by the server, of the article computer controlled vehicle to deposit the article into a specific receptacle associated with a specific order as determined by the server based on the comparison.

According to various embodiments of the presently disclosed subject matter, a method of directing a medication sorting operation by system 500 or server 502 comprises acquiring, by an information acquisition device, of a first prescription information from a tag coupled to a prescription drug container. The method further comprises receiving, at a server, of the first prescription information acquired by the information acquisition device. The method further includes determining, by the server, of a receptacle among a plurality of prescription receptacles for an article computer controlled vehicle to transport and deposit the prescription drug container thereto based on the first prescription information. The method also comprises acquiring, by an information acquisition device, of a second prescription information from the tag coupled to the prescription drug container prior to the deposition of the article into a receptacle. The method further comprises receiving, at the server, of the second prescription information acquired by the information acquisition device. The method furthermore comprises comparing, by the sortation engine operating as a prescription verification engine, of the first prescription information against the second prescription information. The method also comprises directing, by the server, of the article computer controlled vehicle to deposit the prescription drug container into a specific receptacle (e.g., in the form of a prescription receptacle) associated with a specific order as determined by the server based on the comparison. Whereas retail pharmacies dispense controlled substances directly to the patient, central fill pharmacies provide a service to retail pharmacies by preparing and packaging prescriptions for retail pharmacies to dispense to the patient. The biggest benefit from central fill operation is from automation of a major portion of the operations. However, any errors in fulfilling prescription orders can lead to undesirable litigation and governmental inquiries, actions, and stiff fines. Accuracy is accordingly important in the field of centralized automated fulfilling of prescription medications. The disclosure provided herein may advantageously aid in verification of automated fulfilling of prescription medications in centralized operations. According to one or more embodiments, system 500 further comprises one or more of a sorting verification system and a prescription verification engine that is configured to: scan, by at least one of the information acquisition devices, a top region of the article computer controlled vehicle to confirm that the prescription fluid container has been deposited into the prescription receptacle.

In one embodiment, system 500 includes three or more levels of platforms, all for sorting to a put wall; accordingly, one embodiment includes 3 or more levels of unit sortation. In one embodiment, one or more put walls are provided near the system, the put walls provided with various size locations, bins, or receptacles for orders of different sizes. Items for larger orders may sort on the lower level to larger bins and higher levels sort smaller orders into smaller bins. The system may possess cubic data for each item and the system is configured to calculate the volume of each order.

According to one or more embodiments, a method of directing a medication sorting operation by system 500 or server 502 includes acquiring, by an information acquisition device, of a first prescription information from a tag coupled to a prescription drug container. This method further includes receiving, at a server, of the first prescription information acquired by the information acquisition device. The method further includes determining, by the server, of a receptacle among a plurality of prescription receptacles for an article computer controlled vehicle to transport and deposit the prescription drug container thereto based on the first prescription information. The method further includes acquiring, by an information acquisition device, of a second prescription information from the tag coupled to the prescription drug container. The method further includes receiving, at the server, of the second prescription information acquired by the information acquisition device. The method further includes comparing, by the sortation engine operating additionally as a prescription verification engine, of the first prescription information against the second prescription information. The method further includes directing, by the server, of the article computer controlled vehicle to deposit the prescription drug container into the receptacle based on the comparison.

Fulfilling of prescription orders is a highly regulated industry for obvious reasons with regulatory compliance requirements stipulated, for example, by Health Insurance Portability and Accountability Act of 1996 ("HIPAA") in the US and similar other laws, rules and regulations adding unique complexities to centralized prescription filling operations that are not otherwise faced by central fill operations in other industries. A pharmacy considering central fill operations needs to ensure that business operating aspects such as pharmacy licenses, pharmacist licenses, patient care and prescription ownership are not negatively impacted by centralized consolidation of prescription fulfillment. Any errors in fulfilling prescription orders can lead to undesirable litigation and governmental inquiries, actions, and stiff fines. Accuracy is accordingly important in the field of fulfilling prescription orders, particularly as it relates to centralized automated fulfilling of prescription medications. Accordingly, a need exists for a solution that would permit an automated central fill pharmacy to operate in a reliable and cost-effective manner.

According to one or more embodiments, server 502 is further configured to associate an order with the prescription receptacle. According to one or more embodiments, the server is further configured to direct removal of the receptacle after completion of the order, and replacement with an empty prescription receptacle. According to one or more embodiments, the server is further configured for directing removal of the receptacle after completion of the order. According to one or more embodiments, the order comprises a plurality of prescription fluid containers. According to one or more embodiments, the server is further configured to direct affixing of an address information to the package. According to one or more embodiments, the package sorting platform is elevated as compared to the first platform. According to one or more embodiments, the package sorting platform is above the article sorting platform whereby the package sorting platform occupies the same or similar footprint as the first platform. According to one or more embodiments, the system further includes the tag comprises a RFID (Radio-frequency Identification) associated with the prescription fluid container. According to one or more embodiments, system 500 is further configured to: subject, by server 502, the article computer controlled vehicle carrying the prescription fluid container into a resolution routine when a discrepancy is identified during the comparing step. According to one or more embodiments, the information acquisition devices are fixed in position. According to one or more embodiments, the information acquisition device is shared by the plurality of prescription receptacles.

Embodiments of the presently disclosed subject matter provide for a solution that can permit an automated central fill multi-function sorter system to operate in a reliable and cost-effective manner. Embodiments disclosed herein can further provide for one or more of: detection, correction, reduction, and elimination of errors in automated fulfilling of prescription orders. Embodiments disclosed herein can accordingly provide for improved accuracy in automated fulfilling of prescription orders than is possible under existing methods. Embodiments disclosed herein can further provide for an improved automation solution by way of a prescription order consolidation and shipping sortation in one combined footprint.

Embodiments of system 500 disclosed herein overcome the limitation by providing benefits such as: (1) space savings, (2) operational and resource efficiency, (3) elimination of extra equipment or labor (no additional conveyor belts to move articles from one system to another, etc.), (4) minimizing of operator movement, (5) time savings, (6) cost savings (for e.g., no investment needed for equipment connecting both systems).

FIG. 1 depicts a block diagram of an exemplary implementation of system 500, wherein several of its components are depicted in a representative manner as blocks representing a generic descriptor of the technology. Server 502 is a control server that is configured for communicating with one or more components of system 500 as described herein, and as shown, for example, in FIG. 1. In one implementation, server 502 includes memory, a processor, and/or one or more communication interfaces communicatively coupled to each other. A network may form part of system 500, wherein the network may take on any appropriate form, including a wireless network such as Wi-Fi, cellular, or other frequency bands for private use, or a hard-wired network such as LAN (local area network), WAN (wide area network), internet, etc., and combinations thereof. In one implementation, server 502 may communicate over the network with the cloud. In some implementations, one or more components of server 502 may reside in the cloud. Similarly, several of the components such as, for example, information acquisition devices, wireless access point 514, article computer controlled vehicle 112, package computer controlled vehicle 212, and server 502 may communicate over the network with the cloud. In some implementations, one or more components of system 500 may reside in the cloud. For example, in one implementation, server 502 may reside in the cloud. In at least one implementation, server 502 may be in communication with one or more third-party servers, such as warehouse management system servers and automated vehicle operations control servers.

As used herein, the term "cloud" refers to several servers connected to the internet that can be leased as part of a software or application service. Cloud-based services can include web hosting, data hosting and sharing, and software or application use. The term "cloud" also refers to cloud computing, where several servers are linked together to share the load. This means that instead of using one single powerful machine, complex processes can be distributed across multiple smaller computers. In various implementations, server 502 can be or can otherwise include a server as the term "server" is understood in its broadest sense. The term "server" as used herein includes any computer that provides data to other computers. It may serve data to systems on a local area network (LAN) or a wide area network (WAN) over the Internet. In various implementations, server 502 can be or can include a cloud server. The term "cloud server" as used herein includes any pooled, centralized server resource that is hosted and delivered over a network—typically the Internet—and accessed on demand by multiple users. A cloud server can be remotely located (e.g., reside in a remote cloud server configuration). A cloud server can be a virtual server (rather than a physical server) running in a cloud computing environment. A cloud server can be built, hosted, and delivered via a cloud computing platform via the internet, and can be accessed remotely. A cloud server can include all the software it requires to run and can function as an independent unit. A cloud server can perform all the same functions of a traditional physical server including delivering processing power, storage, and applications. One of the advantages of cloud storage is that there are many distributed resources acting as one—often called federated storage clouds. This makes the cloud very tolerant of faults, due to the distribution of data. Use of the cloud can reduce the creation of different versions of files, due to shared access to documents, files, and data.

Each of the components shown in FIGS. 1-20 may be in communication with one or more other components through a wired and/or a wireless network. For example, the cloud, the server 502 may communicate with a sorting verification system, sortation engine 508 comprising a prescription verification engine, or sortation engine 508 acting additionally as a prescription verification engine, an article information database, a prescription information database, information acquisition devices, article computer controlled vehicle 112, package computer controlled vehicle 212, automated packaging device 555, and wireless access point 514 over a network.

As mentioned herein, the term "prescription drug container" may include any item sold at or by a pharmaceutical store and is not necessarily limited only to sale of medicament, prescription-based or otherwise. The term "prescription drug container" can accordingly include an item of business, a thing of a particular and distinctive kind or class, a member of a class of things, an item of goods, and similar other items. In various embodiments, a prescription drug container may comprise one or more of: a case, a container, an item, a parcel, and a bag. In various embodiments, the term "prescription drug container" may comprise a plurality of articles associated with a multiple-order batch. In various embodiments, the prescription drug container supply location may comprise one of: a retail store, a fully or partially automated retail order fulfillment store, and a local fulfillment center. Embodiments as disclosed herein may be advantageously installed in retail supercenters, warehouses, grocery stores, mall anchors, club warehouses, or any large format retail store or pharmacy store setting.

Server 502 as described herein can be a controller that can be used in conjunction with all kinds of compatible sortation devices, techniques, and systems, including those as described above. Accordingly, it is reiterated that the descriptions of the various embodiments of the present invention have been presented for purposes of illustration but are not intended to be exhaustive or limited to the embodiments disclosed.

In some embodiments, system 500 further includes a detection device, wherein the detection device is configured to detect whether a receptacle or package receptacle is full or not and to transmit to server 502 the obtained information regarding whether the receptacle is full or not, and the transfer device is configured to transfer the storage device which is full according to an instruction from the server 502. There are many options for the transfer device, e.g., an intelligent robot; and for another example, the storage device is mounted on the transfer device, and the transfer device is a large-scale auto-navigating vehicle and may move to a position and load and unload the articles according to the control instruction of the server 502.

In at least one embodiment, when server 502 determines that a customer's prescription order or a retail pharmacy store's order has been completed, server 502 updates an electronic database to reflect this, with server 502 being in electronic communication with the electronic database. In one embodiment, the electronic database may reside in the cloud. According to at least one embodiment, each time article computer controlled vehicle or package computer controlled vehicle 212 deposits an item into a receptacle, server 502 may update the status of the order in the electronic database.

According to one or more embodiments, server 502 is further configured to determine a characteristic of one of the prescription drug containers by interacting with the prescription drug container with the information acquisition device. The characteristics include one of size, color, deformation, or another defect of the prescription drug container.

Embodiments described herein may accordingly provide for a solution that meets patient needs; minimizes the cost of quick response prescription fulfillment; and efficiently manages inventory. Embodiments disclosed herein can be rapidly deployed and modified. Embodiments described herein may operate to eliminate lead time while reducing cost, complexity, and space and simultaneously enabling more flexibility, modular growth, operating cost savings, and simplicity. One of system 500 and a sorting verification system forming of part of system 500 may further include high volume autofill options. Embodiments disclosed herein may advantageously be used by: central fill pharmacies (also referred to as refill pharmacies or fulfillment centers) that provide a service to retail pharmacies by preparing and packaging prescriptions for retail pharmacies to dispense to the patient, and by large national pharmacy chains to improve efficiencies gains accrued from centralizing filling of prescription orders that are then either delivered to homes of customers or picked up at the respective local pharmacy by customers.

As to the above, they are merely specific embodiments of the present invention; however, the scope of protection of the present invention is not limited thereto, and within the disclosed technical scope of the present invention, any modifications, or substitutions that a person skilled in the art could readily conceive of should fall within the scope of protection of the present invention. Thus, the scope of protection of the present invention shall be determined by the scope of protection of the appended claims.

A person of ordinary skill in the art would understand that the implementations described in this application are examples, and that the scope of this application is not limited by these examples or implementations. For instance, while the preferred implementation relates to sorting robots, the apparatus and method described herein would apply equally well to any automated vehicle set up meant for transporting or transferring articles of disparate sizes. For instance, the disclosed apparatus and method would also be applicable for pick assist robot applications. Similarly, the disclosure here is also relevant to lifting robots and several other types of robots used in warehouse and material handling facility applications.

What is claimed is:

1. A system for packing and sorting, comprising:
   a server comprising a memory, a processor, and a sortation engine,
   an automated packaging device configured to:
      receive one or more sorted articles through an opening of a repository of the automated packaging device, and
      seal the repository to form a package; and,
   a package sorting system configured to:
      direct a package computer controlled vehicle to move to a receiving position about the automated packaging device for receiving the package from the automated packaging device, and
      direct the package computer controlled vehicle to transport and deposit the received package into a package receptacle,
   a secondary sorting system configured to sort the one or more articles associated with an order into a respective article receptacle, wherein the secondary sorting system comprises a 3D (three-dimensional) sorting system, the 3D sorting system comprising:
      two shelves, each shelf composed of a plurality of storage locations vertically arranged on the shelf, each storage location configured to accept therein an article receptacle; and,
      an article lift translating along three axes about a conveying rail frame, the conveying rail frame arranged between the two shelves and parallel to at least one of the two shelves, the article lift configured to sort an article received at the article lift to one of an article receptacle located at one of the plurality of storage locations of a shelf responsive to instructions received from the server.

2. The system of claim 1, wherein the secondary sorting system comprises a wall of sorting article receptacles for an operator to transfer all articles associated with an order to a respective article receptacle.

3. The system of claim 1, further comprising a tote tilter positioned between the 3D sorting system and the automated packaging device, the tote tilter configured to empty the one or more articles out of an article receptacle of the 3D sorting system into a bagging inlet of the automated packaging device.

4. The system of claim 1, wherein 3D sorting system is further configured to determine that the automated packaging device is ready for a tote tilter to empty out the one or more articles present in an article receptacle of the 3D sorting system into a bagging inlet of the automated packaging device.

5. The system of claim 1, further comprising a primary sorting system, wherein an output of the primary sorting system is provided as an input to the 3D sorting system.

6. The system of claim 5, wherein the 3D sorting system is configured to consolidate orders whereby the one or more articles associated with an order are sorted into a respective article receptacle.

7. The system of claim 5, wherein the primary sorting system comprises one or more of a: conveyor, robotic arm sorter, tilt tray sorter, sweep sorter, activated roller sorter, cross belt sorter, and split tray sorter.

8. The system of claim 5, wherein the primary sorting system comprises a plurality of article computer controlled vehicles traversing an article sorting platform, wherein the primary sorting system is configured to direct the article computer controlled vehicles to transport and deposit the one or more articles to be packaged at the lift of the 3D sorting system.

9. The system of claim 8, wherein the article sorting platform is spaced apart from a package sorting platform, wherein optionally an elevator is configured to transfer the article computer controlled vehicles between a floor level and one of: the article sorting platform and the package sorting platform.

10. The system of claim 9, wherein the package sorting platform is arranged above or below the article sorting platform in a vertically stacked configuration.

11. A system for packing and sorting, comprising:
a server comprising a memory, a processor, and a sortation engine,
an automated packaging device configured for:
receiving one or more articles through an opening of a repository of the automated packaging device, and
sealing the repository to form a package; and,
a package sorting system configured to:
direct a package computer controlled vehicle to move to a receiving position about the automated packaging device for receiving the package from the automated packaging device; and,
direct the package computer controlled vehicle to transport and deliver the received package to a post-packing sorting system,
wherein one of:
an elevator transfers the package computer controlled vehicle from a floor level to a package sorting platform spaced apart from the floor level; or
the package computer controlled vehicle deposits the package at a lift of a post-packing sorting system.

12. The system of claim 11, further comprising:
a primary sorting system configured to deliver the one or more articles to a secondary sorting system;
the secondary sorting system configured to consolidate the one or more articles associated with an order to an article receptacle, and
an article receptacle transport system configured to direct a receptacle computer controlled vehicle to transport the article receptacle to a delivery position about the automated packaging device.

13. A system for packing and sorting, comprising:
a server comprising a memory, a processor, and a sortation engine;
a system for consolidation of articles into an order;
an automated packaging device configured to:
receive one or more articles through an opening of a repository of the automated packaging device, and
seal the repository to form a package; and,
a package transfer system configured to direct a computer-controlled conveyance mechanism to transfer the package from the automated packaging device for delivery to a post-packing sorting system,
wherein the computer-controlled conveyance mechanism comprises a robotic arm configured to transfer the package onto a robotic vehicle for delivery to the post-packing sorting system.

14. The system of claim 13, wherein the computer-controlled conveyance mechanism comprises a robotic arm configured to transfer the package to one or more of: a conveyor system and a robotic vehicle for delivery to the post-packing sorting system.

15. A system for packing and sorting, comprising:
a server comprising a memory, a processor, and a sortation engine,
an automated packaging device configured to:
receive one or more sorted articles through an opening of a repository of the automated packaging device, and
seal the repository to form a package; and,
a package sorting system configured to:
direct a package computer controlled vehicle to move to a receiving position about the automated packaging device for receiving the package from the automated packaging device, and
direct the package computer controlled vehicle to transport and deposit the received package into a package receptacle,
wherein the package sorting system comprises a plurality of package computer controlled vehicles directed by a package sorting controller;
wherein the package computer controlled vehicles traverse a package sorting platform; and
wherein an elevator is configured to transfer the package computer controlled vehicles between a floor level and the package sorting platform spaced apart from the floor level.

16. A system for packing and sorting, comprising:
a server comprising a memory, a processor, and a sortation engine,
an automated packaging device configured to:
receive one or more sorted articles through an opening of a repository of the automated packaging device, and
seal the repository to form a package; and,
a package sorting system configured to:
direct a package computer controlled vehicle to move to a receiving position about the automated packaging device for receiving the package from the automated packaging device, and
direct the package computer controlled vehicle to transport and deposit the received package into a package receptacle,
wherein the automated packaging device is further configured to print indicia to the package, wherein the indicia identify one or more of: a customer order associated with the package, a store associated with the package, a delivery address associated with the package, and a business associated with the package.

\* \* \* \* \*